United States Patent
Wagener et al.

[11] 3,967,176
[45] June 29, 1976

[54] PROCESS CONTROL APPARATUS

[75] Inventors: Paul W. Wagener, Depew; Francis A. Fluet, Clarence, both of N.Y.

[73] Assignee: Westinghouse Electric Corporation, Pittsburgh, Pa.

[22] Filed: Oct. 15, 1974

[21] Appl. No.: 514,873

[52] U.S. Cl. .............................. 318/603; 318/685
[51] Int. Cl.² .................................... G05B 19/28
[58] Field of Search .......... 318/561, 562, 571, 572, 318/600, 601, 603, 604, 685, 696

[56] References Cited
UNITED STATES PATENTS

| | | | |
|---|---|---|---|
| 3,184,663 | 5/1965 | Mergler | 318/571 X |
| 3,206,665 | 9/1965 | Burlingham | 318/603 X |
| 3,411,058 | 11/1968 | Madsen et al. | 318/696 |
| 3,466,517 | 9/1969 | Leenhouts | 318/603 |
| 3,582,751 | 6/1971 | Rosshirt et al. | 318/601 X |
| 3,594,563 | 7/1971 | Bishop | 318/572 X |
| 3,641,326 | 2/1972 | Harte | 318/562 X |
| 3,699,555 | 10/1972 | du Vall | 318/561 UX |
| 3,820,287 | 6/1974 | Klar et al. | 318/571 X |
| 3,840,792 | 10/1974 | Yokoe | 318/572 |
| 3,864,557 | 2/1975 | Sinclar | 318/571 X |

Primary Examiner—Gene Z. Rubinson
Attorney, Agent, or Firm—C. M. Lorin

[57] ABSTRACT

The invention relates to process control in general and to numerical control machining in particular. A programmable digital controller is associated with a digital motion control unit in which are stored numerical data for point-to-point operation of a machine tool, for instance a grinder. The motion control unit is of the incremental type and generates command pulses which are applied to a stepping motor. Numerical data are stored defining desired displacement, velocity and sign of travel, and dress compensation. A feedback loop with the machine tool provides corrective pulses when the command pulses sent are not in exact relation with the increments of displacement effectively imparted on the tool. The programmable controller can be coupled to a plurality of motion control unit controlling one or more machine tools, or axes, and it is performing sequence control in relation to industrial process as well.

7 Claims, 18 Drawing Figures

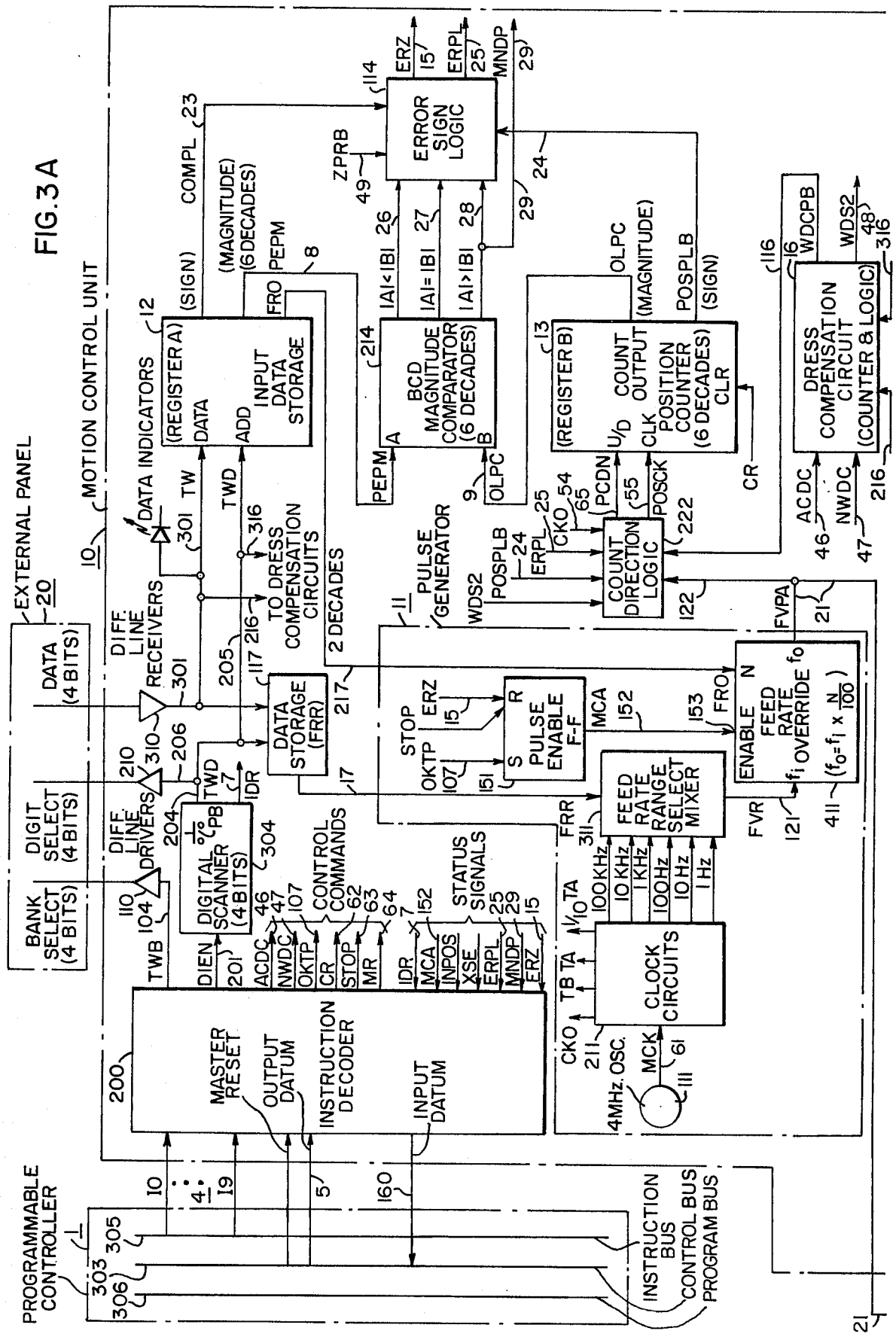

FIG.12A

PROCESS CONTROL APPARATUS

CROSS REFERENCE TO RELATED APPLICATION

This application is related to copending application Ser. No. 481,267 filed on June 20, 1974 for "System and Method for Programmable Sequence Control" and assigned to the Assignee of the present application.

BACKGROUND OF THE INVENTION

Sequence control of an industrial process in accordance with a relay logic diagram lends itself to digital control and with certain techniques such as shown in the referenced copending application offers a remarkable degree of sophistication with a minimun capacity requirement and an attractive low cost configuration. When it comes to numerical control, a digital handling of numerial data because it requires conversion of data from decimal to binary and involves mathematical treatment rather than mere Boolean equations, introduces elements of complexity which upset the favorable aspects of sequence control. As a result the prior art generally shows numerical control machines which combine the two aspects of the control operation and such equipment no longer qualifies as a sequence controller, and even less as a programmable controller.

It is also known to have a digitally controlled incremental system for imparting point-to-point movement to a machine tool activated by a stepping motor. Typical of such prior art are U.S. Pat. No. 3,324,281 of Morse and United States Pat. No. 3,403,386 of Perkins. However, the prior art devices do not make a full use of digital techniques. Thus, Morse and Perkins depend too much on mechanical devices. More generally they do not lend themselves to full digital treatment nor to an extensive use of integrated circuit technology. In particular, sequence control is not harmoniously combined with motion control.

Sequence controllers are well known, and an overview of the state of the prior art in this respect can be found in "Programmable Logic Controllers-An Update" by N. Andreiev, in Control Engineering of Sept., 1972, pages 45–47; and in "Programmable Logic Controllers-Painless Programming to Replace the Relay Bank" by G. Lapidus in Control Engineering of Apr., 1971, pages 49–60. On the other hand, the art of computerized numerical control is largely described in "The Technical Ins and Outs of Computer-ized Numerical Control" by P. G. Mesniaeff in Control Engineering of Mar., 1971, pages 65–84.

The chief object of the present invention is to provide a harmonious combination of sequence controlling and numerical control.

Another object of the present invention is to provide a motion control unit which can be coupled to a programmable controller for point-to-point operation along an axis.

A further object of the present invention is to extend the capability of a programmable controller so as to perform numerical control operations without affecting the structural logic of a programmable controller.

Still another object of the present invention is to provide improved motion control of a machine tool with extensive use of printed circuit technology.

An object of the present invention is also to provide improved motion control of a grinding machine, in particular with automatic compensation for dressing operations of the grinding wheel.

SUMMARY OF THE INVENTION

The invention relates to process control in general and to numerical control machining in particular.

A motion control unit is provided to generate command pulses applied to a stepping motor in order to cause incremental displacements of the machine tool. The motion control unit according to the present invention combines (1) numerical data received from an external panel, (2) numerical data stored by feedback from the machine tool and (3) functional digital signals for digital treatment of successive point-to-point operations. Digital treatment is initiated by operative steps from a programmable controller for each of the successive point-to-point operations.

A novel and unique combination of a programmable controller and a motion control unit is also provided, in accordance with the present invention, in order to facilitate sequential processing and numerical control.

The implementation of the invention calls for an original mode of generating command pulses and of digitally controlling their pulse rate to obtain the required velocity. Also forward and reverse displacements are digitally defined and controlled by reference to absolute numerical data and to actual tool positions.

When the tool is a grinding wheel special measures have been taken in order to take into account the dressing operations, also by digital control from the programmable controller and through the motion control unit.

BRIEF DESCRIPTION OF THE DRAWINGS

FIGS. 3A and 3B illustrate with more detail the preferred embodiment of the present invention;

FIGS. 12A and 12B show the smoothing delay circuit of FIGS. 2 and 3A;

DESCRIPTION OF THE PREFERRED EMBODIMENTS

A. The Incremental System

Figure 1:
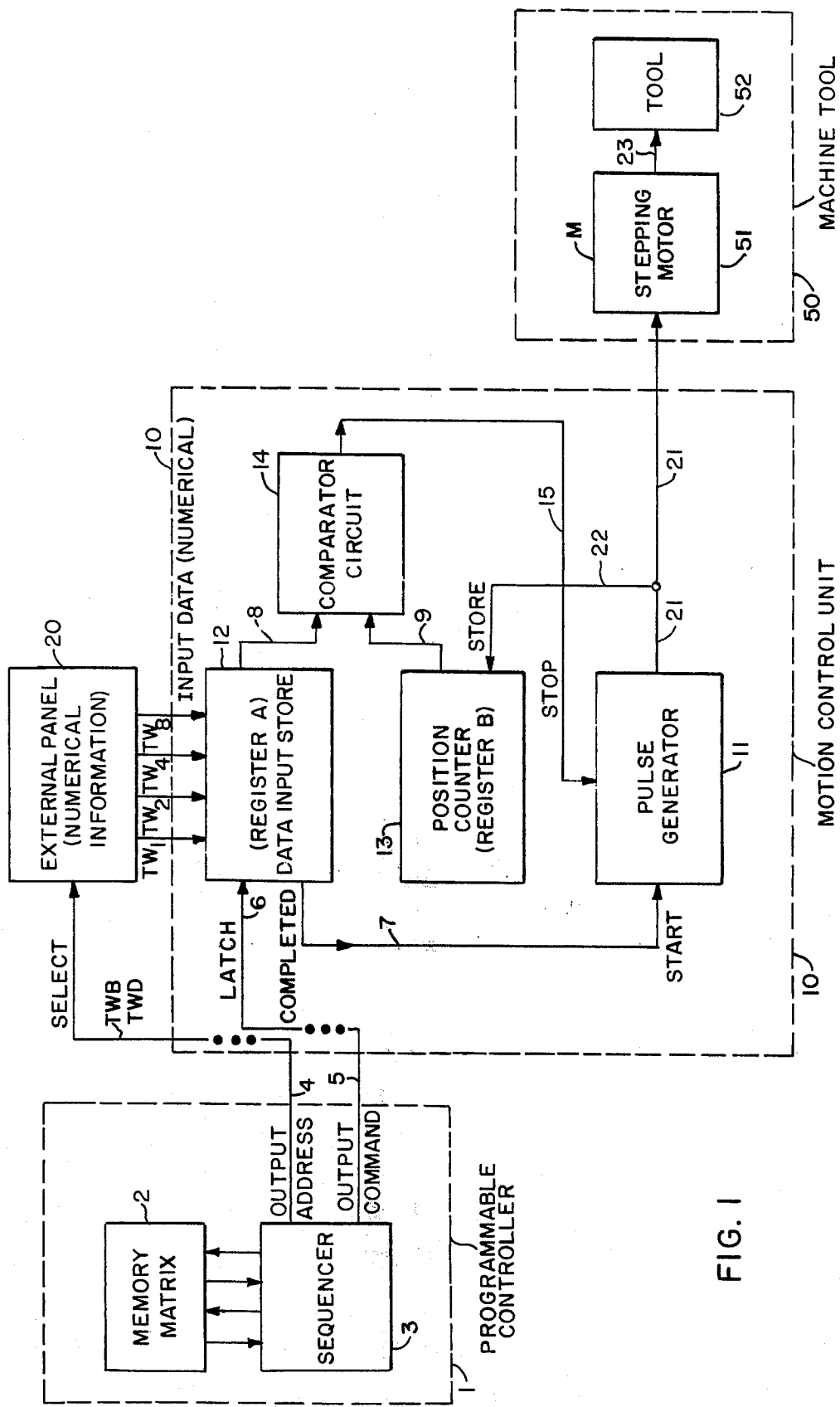
FIG. 1 shows an overall view of the apparatus according to the present invention.

FIG. 1 shows the incremental system according to the present invention comprised of a motion control unit 10 actuating a machine tool 50 under control of a programmable controller 1. The motion control unit includes a pulse generator 11 from which command pulses are derived on line 21 onto a stepping motor 51 coupled to the tool 52 of the machine tool. Each command pulse causes an incremental motion of the motor thereby imparting displacement of the tool along a trajectory. As a result, the tool is moved from point to point in accordance with numerical position data assigned as desired for each displacement. A point-to-point operation is initiated by an output command issued on line 5 from the sequencer 3 of the programmable controller 1. Such command is for one of a sequence of operations which have been programmed into the memory matrix 2 associated with the sequencer. Numerical position data are selected by the sequencer on line 4 out of an external panel 20 which may be a keyboard, or banks of thumbwheels of the machine tool. The selected data are then stored into register A which is part of a data storage 12. Such storing operation is controlled by the output command on line 5 of the programmable controller 1.

The programmable controller can be used to control several machine tools such as the one at 50, and it could control several axes of the same machine tool rather than only one as shown in FIG. 1. In such cases, sequencer 3 would develop as many output commands as needed, properly addressed, in order to operate a motion control unit such as 10, or to effect various operative steps within a sequence of industrial operations involving for instance the change of state of a limit switch, of a solenoid, a push-button, or any bistable device representing a logical function such as: stop, start, measure, detect, cool, read, set, true, or false, etc.

For purpose of clarity, FIG. 1 shows a single output command on line 6 addressed to a point-to-point operation by the motion control unit 10 and performed in accordance with numerical position input data from the external panel 20 stored into register A of data storage 12. These numerical instructions may have been set by an operator on the external panel at a remote location. They may also be fed automatically to the motion control unit, for instance from a tape. These instructions are in the form of a decimal number converted into binary coded decimal as suitable for digital treatment by the motion control unit 10.

Once latching of the input data into register A has been completed, a start signal is sent on line 7 to pulse generator 11 which commences generating pulse commands on line 21 to the stepping motor. As a result, tool 52 is advancing incrementally. At the same time, each of these pulse commands is stored via line 22 into register B of position counter 13. The motion control unit 10 further includes a comparator 14 which continuously compares the pulse count in Register B with the stored count of Register A. When the two counts on lines 8 and 9 are matched in magnitude, comparator 14 generates on line 15 a command to stop the operation of pulse generator 11. At that time, tool 52 will have moved by an amount corresponding to the numerical position data selected from the external panel 20. As it appears, the incremental system of FIG. 1 is of the open loop type. This is in contrast to close loop systems such as described in U.S. Pat. No. 3,403,386 of Perkins. The circuit of FIG. 1 also has this particularity that numerical control is performed by the motion control unit under numerical position input data independently from the sequence of operations programmed in the memory matrix of the controller. As a result, the latter can retain its simplicity and low cost.

Figure 2:
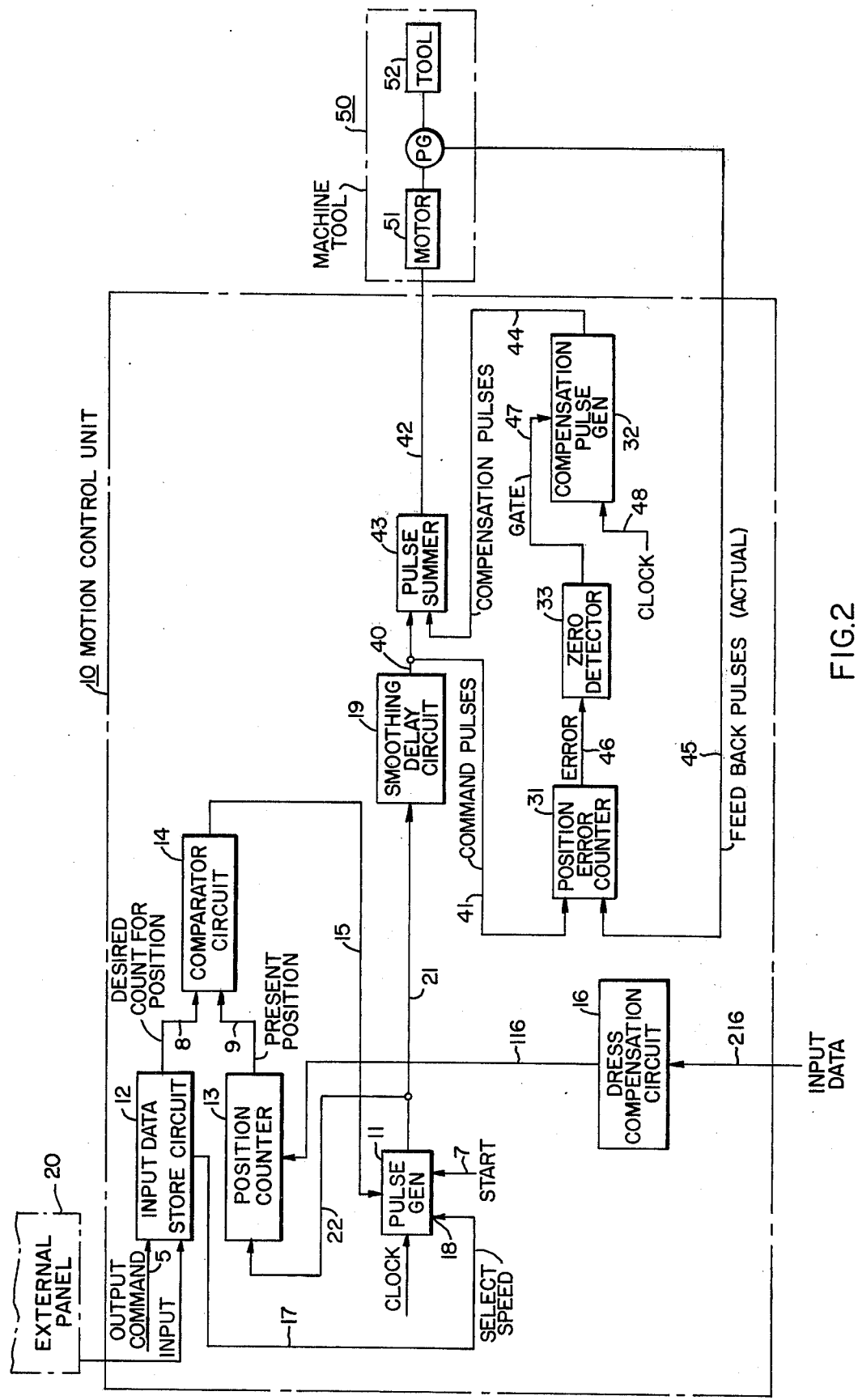
FIG. 2 shows in block diagram the preferred embodiment of the present invention.

FIG. 2 shows with more detail the motion control unit 10. It is assumed here that the tool is the grinding wheel of a grinding machine, and that the external panel 20 is in the form of thumbwheel banks. An operator has initially set into the banks binary coded decimal representations of desired displacements for successive point-to-point operations of the grinding wheel. The thumbwheel banks also have enough space to accommodate numerical indications relative to velocity and direction of motion. They are also able to store a count of the difference in the distance from the grinding wheel to the workpiece due to an intervening dressing operation. Besides the data storage circuit 12, the position counter 13, comparator circuit 14 and pulse generator 11 which are similar to the circuits of like numerical reference in FIG. 1, the motion control unit 10 shown in FIG. 2 comprises a dress compensation circuit 16 in which are stored via line 216 input data representing the amount of material taken away from the grinding wheel by dressing. Since the face of the dressed tool no longer is what it originally was, the next grinding operation must take the difference into account and provide a compensation in order to achieve the correct displacement from point-to-point. For this purpose, the dress compensation circuit 16 adds to the count of the position counter 13 as many pulses as necessary, according to the input data on line 216 from the external panel which is provided with additional capacity for that purpose.

Besides position and dress compensation, the external panel provides data regarding to velocity of travel. Data storage 12 generates an output signal on line 17 in accordance with velocity data stored therein from the external panel. The pulse generator 11 is controlled by the signal on line 17 so as to assume a pulse rate as desired. The stepping motor will be actuated with a speed determined by such pulse rate.

The motion control unit 10 also includes a smoothing delay circuit 19 inserted on line 21 between the pulse generator 11 and the stepping motor 51. The object of such circuit is to raise the pulse rate of the pulse commands effectively received by the stepping motor progressively to zero from the start of the motion, and to reduce the pulse rate progressively to zero towards the end of the motion so as to create an initial acceleration and a terminal deceleration in the point-to-point operation.

Another feature of the motor control unit 10 of FIG. 2 is to be found in a close loop comprising feedback line 45 from a feedback pulse generator coupled to the shaft of motor 51, position error counter 31, error signal line 46, zero detector 33 and compensation pulse generator 32. The feedback pulses developed by the feedback pulse generator PG correspond to actual increments of the stepping motor 51, or of the tool 52, under the command pulse effectively received. If there is any discrepancy between the number of command pulses sent on line 21 and the number of turns of the stepping motor effectively obtained, the number of command pulses on line 41 will not match the number of pulses on line 45. An error signal will appear on line 46 at the output of position error counter 31. In such case, zero detector 33 will gate, via line 47, pulse generator 32, thus to generate compensating pulses at the output on line 44. These pulses are added or subtracted in pulse summer 43 to the original command pulses of line 40, so that on line 42 the number of exact command pulses is fed to the stepping motor. When generator PG feeds back enough pulses to match the command pulses on line 41, pulse generator 32 is no longer gated by the zero detector 33, and no additional pulse appears on lines 44 and 42. Such compensation circuit is necessary in order to prevent the effects of tool reaction and machine inertia and backlash, and more generally to compensate for any inaccuracy in the mechanical transmission and conversion of the electrical pulse commands into accrued incremental displacements.

Figure 3B:
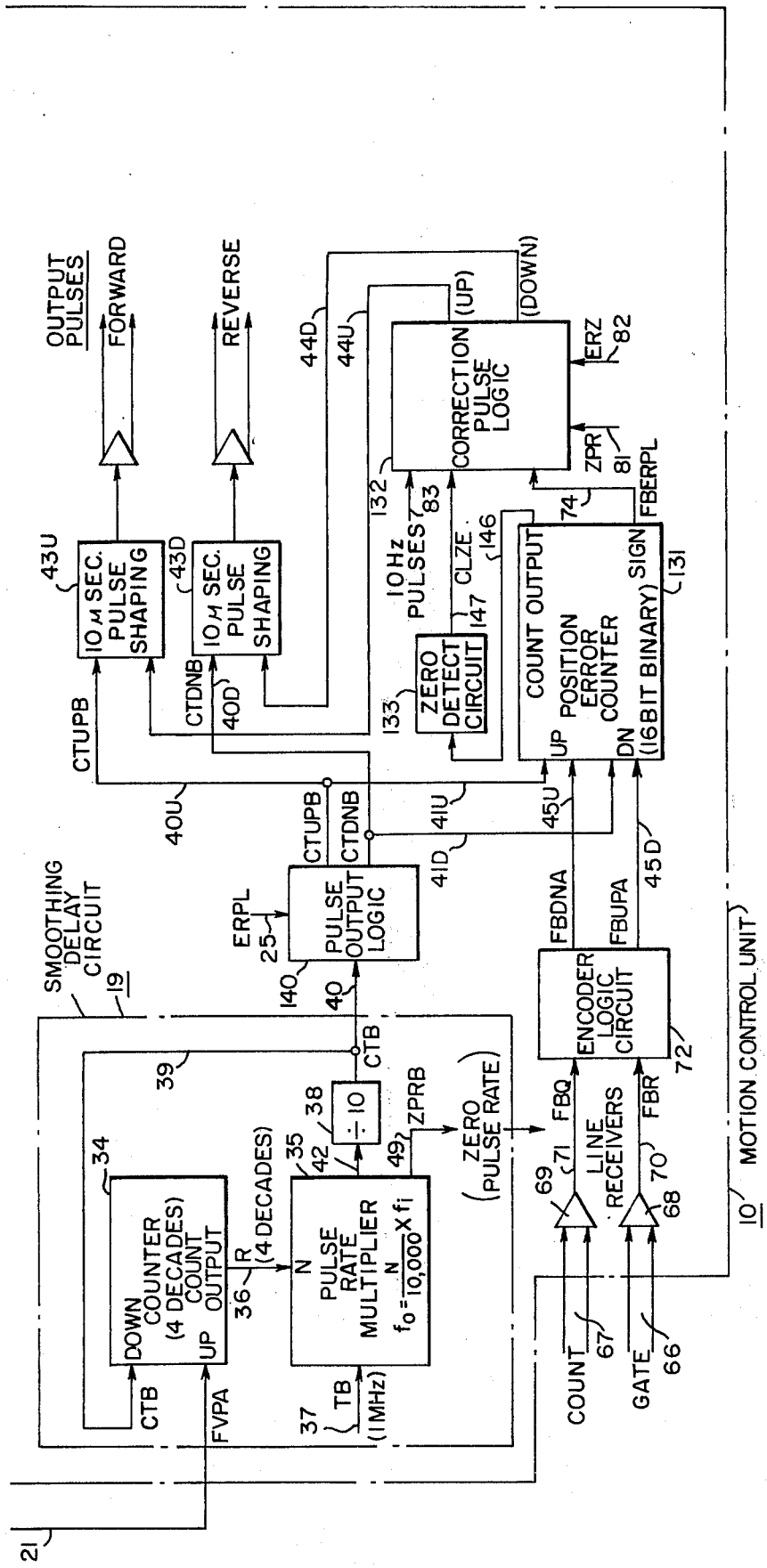

The motion control unit of FIG. 2 is shown in FIGS. 3A and 3B with still more details. The tool is again a grinding wheel. Circuit 20 is a thumbwheel assembly of eleven banks. Each bank carried nine decades totalizing a 36-bit storage capacity. Eight of these decades (32 bits) represent input data regarding position and speed, each 4-bit datum being read along four binary lines $TW_1$, $TW_2$, $TW_4$ and $TW_8$ leading to the motion control unit. Each line carries a binary bit (0, or ONE) and the four TW lines are weighted so as to provide together the nine decimal figures coded in the 8, 4, 2, 1 BCD code (binary coded decimal). For instance: 0100 = 4 (a "four" in the second position); 1000 = 8 (an "eight" in the first position); and 0111 = 7 (a "4", plus a "2", plus a "1"). The nine decades of the selected bank are read decade by decade from lines $TW_1$ – $TW_8$, and the four bits of each digit form one of successive input data to be stored into register A of Data Storage 12. These input data are received via line receivers 310 and 4-bit lines 301.

Considering the nine groups of 4 bits in each bank, 6 decades, (e.g., decimal digits) are reserved for indication of position (24 bits); 2 decades (8 bits) are used for indicating speed. Of the 4 bits forming the last decimal digit, 3 bits are used to designate the speed range selected and 1 bit is assigned to give the sign, e.g., the direction of travel, as will be explained more fully hereinafter. The selection of a thumbwheel bank is made via lines $TW_8$ in response to an address on the instruction but 305 of the programmable controller 1.

The programmable controller is shown in FIG. 3 only by its program bus 306, control bus 303 and instruction bus 305. The programmable controller is preferably of the modular type described in copending patent application Ser. No. 481,267 filed on June 20, 1974 for "System and Method for Programmable Sequence Control" in the name of the same assignee as in this application. The matrix memory has stored 16-bit instructions of which five bits are used for the operation field and 11 bits are for the address field. Ten of those bits $I_0 - I_9$ are shown in FIG. 3 as supplied by instruction bus 305. Of these available address bits, the first four ($I_0 - I_3$) may be used to select one of the eleven banks after decoding by Instruction Decoder 200, thereby to generate and send the proper signal TWZ on 4-bit lines 104, then through differential line drivers 110, onto the selected thumbwheel bank of the external panel 20. The other address bits ($I_4 - I_9$) may be used for other purposes, for instance, on a printed circuit in order to identify the circuit card for enabling its operation.

B. Dichotomy of Programmable Controller and Motion Control Subset

Figure 4:
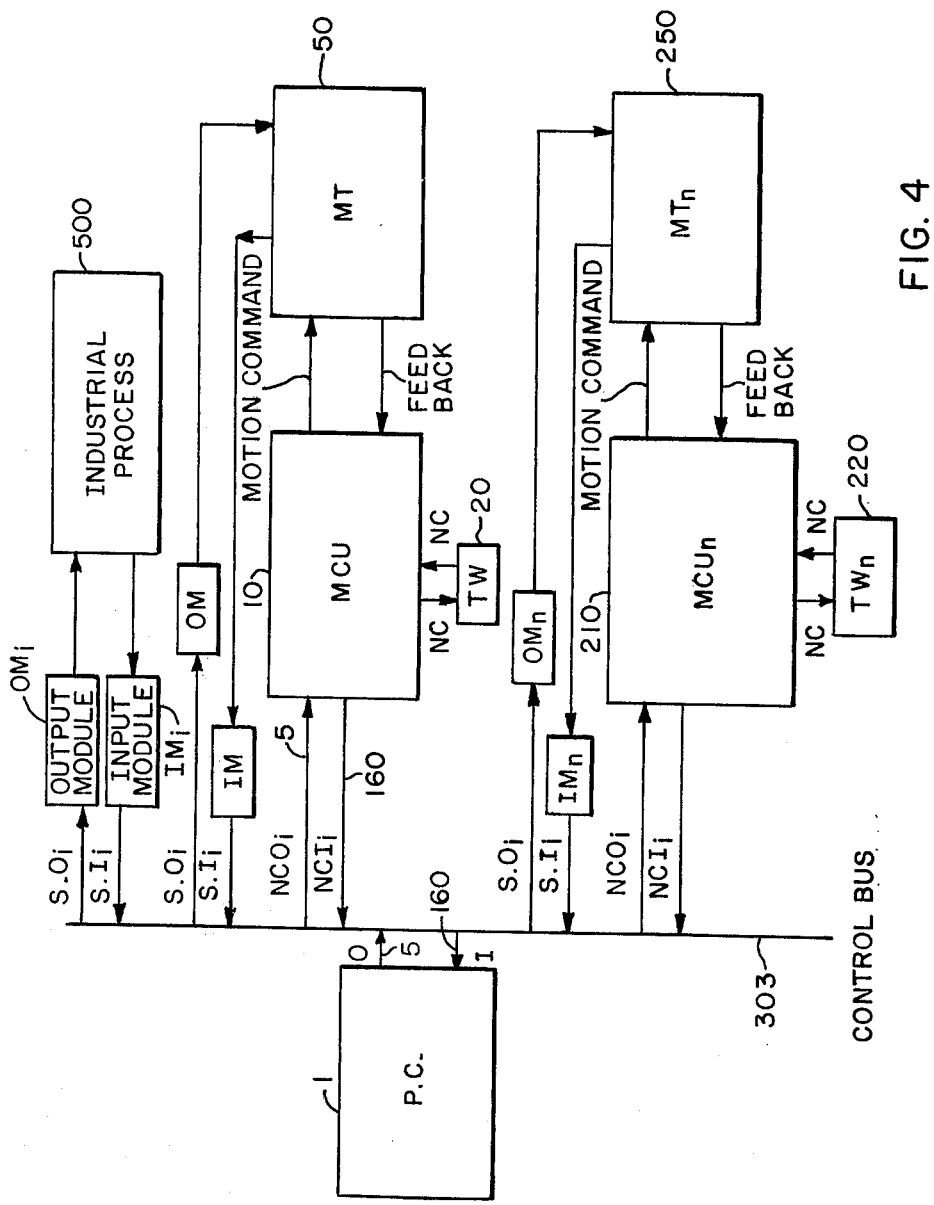
FIG. 4 shows the apparatus according to the present invention in relation to an industrial process and to several machine tools.

The programmable controller is so arranged that a dialogue takes place to and from the controlled process as explained in the above-mentioned patent application and as schematized by the block diagram of FIG. 4. At a given time during digital control, an output datum on control bus 303 may be used by the triac circuit of an output module OMi to generate an output command to a controlled industrial process 500, and conversely, the controlled industrial process may be returning to the programmable controller via an input module IMi an input datum such as at 160 in FIG. 3 which will be acknowledged by the sequencer in accordance with the matrix memory programmed instructions. These output data are associated with an address on instruction lines (not shown in FIG. 4), such as $I_0 - I_9$ from the instruction bus 305 in FIG. 3 which are also used on the way back to the programmable controller in relation to an input datum returned by the instruction decoder 200 from the controlled industrial process. The instruction decoder 200 of FIG. 3 typically shows this double role when responding to a return address on the same lines as those shown at $I_0 - I_9$ for instance for a bank selection. The instruction decoder 200 thus operates as a gate in either direction, as prescribed by the sequencer between the programmable controller 1 and the motion control unit 10.

FIG. 4 illustrates the dialogue between the industrial process 500 and the programmable controller (P.C.), in an exchange of addressed output data such as $S.O._i$ via output modules such as OMi, OM and OMn to command some process step under sequence of operations programmed in the programmable controller, and input data ($S.I._i$) representing process conditions before, during, or after, the performance of any operative step, as transmitted back ($S.I._i$) via input modules such as IMi, IM and IMn to the control bus 303 of the programmable controller.

In the same fashion, the motion control unit 10 (MCU) is responsive to output commands from the programmable controller on line 5. However, in this particular instance, the sequential output datum (NCDi) is for a numerical control operation by the motion control unit and the machine tool 50 (MT). Such output datum is referenced as NCOi. Conversely, operation of the motion control unit 10 is acknowledged, while it proceeds, by input data on line 160 (referenced $NCI_i$). Such a numerical operation is initiated, supervised and monitored by the programmable controller. However, the numerical information required to be performed is in conformity with numerical input data (NC) supplied by the external panel (TW) 20 of the machine tool 50 at a remote location. The selection of such numerical input data and the reading thereof, from the external panel, are performed under control of the programmable controller (PC) through the motion control unit (MCU).

The machine tool itself calls for additional operative steps which are not numerical but require positive or negative measures to be taken in a predetermined order for safe operation of the machine, with certain priorities. These steps may have a certain element of criticality. They are not different in nature from those controlled by an output datum $S.O_i$ or monitored from an input datum $S.I_i$. Also, an output datum such as $NCO_i$ and an input datum such as $NCI_i$ are not different in nature from the other data exchanged at the interface of the programmable controller, except that they relate to operation of a motion control unit such as 10 (MCU), and to that extent they indirectly call for additional data which are numerical and are derived from a panel TW (20) external to the motion control unit.

More generally, the programmable controller may be coupled to a plurality of motion control units, such as $MCU_n$ (210), and also to a plurality of industrial processes, such as 500, to be controlled. Such expansion of the number of controlled units, or processes, does not affect the inherent quality of the instructions. It only requires a sufficient storing capacity of the programmable controller. By the very nature of the operations required from the controller in such instance, the controller can be used to full capacity without losing its most attractive features which are simplicity, low cost and reliability.

In other words, the present invention proposes to substitute for a numerical control system of the prior art, a combination of at least two different control units — 1) a programmable controller, 2) a motion control unit. The programmable controller only performs specific sequencing when communicating with the motion control unit. The numerical control logic proper is performed by the motion control unit only in response to numerical data inputted externally to it. As a result, the programmable controller does not have to receive added complexity and a motion control unit can be built separately with low cost configuration. Consequently, in a system it is possible to satisfy any degree of complexity by modular expansion with motion control units from the shelf and a common controller. Programming of the controller and specific settings on the external panels to fit tooling are the only requirements on the field instead of hardware design from a manufacturer. By the simplicity of the basis design the programmable controller and the associated motion control unit lend themselves to extensive application of printed circuit techniques, as will appear from more specific considerations hereinafter.

C. The Motion Control Unit

1. Instruction Decoder

The matrix memory of the programmable controller has for instance a 16-bit field, among which 10 are used for the address field ($I_0 - I_9$ are shown in FIG. 3 from instruction bus 305). Of these binary lines, four lines $I_0 - I_3$ are used to define the particular function for the motion control unit. These are recognized by the instruction decoder 200 from the instructions received. With four such binary lines the number of combinations is 16. Thus, 16 functions can be assigned to the system. In FIG. 3 are shown some of the functions used in the specific embodiments described. The external panel 20 includes eleven thumbwheel banks, thus for bank selection address lines $I_0 - I_3$ will in fact require eleven of the possible combinations. The remaining five available functions are shown as signals at the output of the instruction decoder 200 and are listed in TABLE I herebelow:

TABLE I

| Function | (Control Commands) Explanation |
|---|---|
| ACDC | Auto Cycle Dress Compensation Initiate |
| NWDC | New Wheel Dress Compensation Initiate |
| OKTP | OK to Position |
| CR | Counters Reset |
| STOP | Pulses Output Stop Command |

Similarly, when the dialogue comes from the motion control unit, function signals are generated in relation to an input datum on line 160 to the control bus 303. The functions shown illustratively in FIG. 3 are as follows:

TABLE II

| Function | (Status Signals) Explanation |
|---|---|
| IDR | Input Data Ready (Input Scan Completed) |
| MCA | Pulse Enable Signal (Motion Command Active) |
| XSE | Excess Error in Position Error Counter |
| ERPL | Position Error Sign Out of Comparator (Error flux) |
| MNDP | Minimum Dress Position ($|A| > |B|$) |
| ERZ | Position Error Equal Zero Out of Comparator |

The function signals of Tables I and II are shown in FIGS. 3A, 3B without indication of the status. It is understood that in the actual circuitry they may be given the value 0 or the value 1. Thus DIEN could be represented DIEN or $\overline{\text{DIEN}}$.

Again, the function signals appear back and forth on the lines to and from the instruction decoder 200, at different times during sequencing by the programmable controller 1.

Considering more specifically the embodiment of FIG. 3, first the address $I_0 - I_3$ from instruction bus 305 causes decoder 200 to generate bank selection signal TWZ, on 4-bit lines 104 via differential line drives. Then, instruction decoder 200 generates an enabling signal DIEN indicating that reading of the address $I_0 - I_3$ has been completed, which is effective because the output datum from control bus 303 is present on line 5. This signal DIEN on line 201 starts a digital scanner 304. As a result, on the scanner's output line 204 digital select signals TWD are sent via 4-bit lines 205 to differential drivers 210 for decade selection. The selected bank is read decade by decade. The reading operation via line 206 is synchronized by the scanning operation with gating (via line 205) of register A thereby to latch in the proper order the input data read. Accordingly, the six decimal digits on the external panel representing magnitude of desired displacement are successively stored decade by decade. The gated input data are the aforementioned 4-bit signals $TW_1 - TW_8$ received from differential receivers 310 on lines 301. Once the six position decades have been read and stored, signal IDR is generated by Scanner 301. This signal is identified by the instruction decoder and communication thereof is made to the programmable controller. The latter returns an enable signal OKTP (OK to position) which signifies to the motion control unit that the generation of pulse commands from pulse generator 11 should be started.

2. Velocity Determination

Besides position data, line 301 also conveys data relative to velocity using to this effect two decades of the external panel. These are latched into storage 12 and at the output a signal FRO is generated, considered hereinafter as the Feed Rate Override control signal. One bit of the decade remaining on the external panel represents the direction of travel. This datum is also stored from line 301 into data storage 12. As a result, data storage 12 supplies on line 23 a control signal indicating the effective direction of travel for digital treatment by the motion control unit. The three remaining bits of the last decade on line 301 are fed via line 402 to Data Storage 117 generating on line 17, at the proper moment, a control signal FRR for the purpose of selecting the appropriate Feed Rate Range, e.g., the velocity of travel, as will be explained hereinafter.

The pulse generator 11 shown in FIG. 3 offers several unique features. It is necessary to choose for a particular point-to-point operation an adequate velocity of displacement. On the other hand with an incremental system such as the motion control unit according to the present invention, the velocity of the tool depends on the pulse rate of the pulse generator controlling the stepping motor. The pulse generator according to the present invention is so arranged that the pulse rate can be digitally controlled to the desired level. A range of frequencies is available from a clock circuit 211, controlled by a master clock 111 operating at 4 Mhz. Six frequency signals are made available in the specific embodiment of FIG. 3, the frequencies being in geometrical progression on a base 10. The scale goes from 1 Hz to 100 KHz. To each such frequency signal corresponds a pulse rate of the pulse generator defining the particular velocity of displacement of the grinding wheel. One of these six rates has been set manually on the selected bank and a corresponding binary value appears on line 301 and 402 represented by 3 bits as follows:

| | |
|---|---|
| 101 | 100 KHz |
| 100 | 10 KHz |
| 011 | 1 KHz |
| 010 | 100 Hz |
| 001 | 10 Hz |
| 000 | 1 Hz |

A corresponding control signal FRR appears on line 17. Control signal FRR determines the frequency signal to appear as signal FVR on line 12 at the output of Feed Rate Range Select Mixer 311. Command pulses are not generated for controlling the stepping motor until all the input data necessary to the motion of the tool have been stored into the input data storage 12, that is, after signal IDR (Input Data Ready, e.g., scanning by digit scan counter is complete) has been derived at the output of the digit scan counter 304 and fed to the Instruction Decoder 200, and above-mentioned signal OKTP (OK to Position, e.g., a command to start motion) has been fed to the pulse enable flip-flop 151 of pulse generator 11. As a result, a signal MCA (Motion Command Active, e.g., a binary signal indicating that pulse commands are being supplied by the pulse generator 11) appearing on line 152 at the output of flip-flop 151 is applied to enable input 153 of Feed Rate Override Circuit 411. This circuit is so designed that the pulse rate of signal FVR is multiplied by a fraction (N/100) so as to convert the pulse rate $f_i$ of signal FVR into an effective pulse rate $f_o = f_i \times (N/100)$, where N is any value between zero and 99, depending on the binary value of the control signal FRO received on line 217 from the Data Storage Circuit 12, e.g., depending on the seventh and eighth decimal digit from the selected bank of external panel. In this manner, pulse signal FVPA is generated on line 21 at the output of pulse generator 11 with a pulse rate $f_o$. This is a unique and novel mode of generating pulse signals at a desired frequency. Mixer 311 of FIG. 3A digitally makes the selection between six basic frequencies, in this instance. Having selected a frequency range under control of signal FRR, the Feed Rate Override Circuit 411 provides any desired frequency level on a centesimal scale, also by digital control. Clock circuit 211 actually comprises several clock circuits which the man skilled in the art can design in any possible way to generate successive scaled frequency signals at the output thereof. The Feed Rate Override Circuit 411, is in the form of a frequency multiplier responsive to signal FVR of the given frequency $f_i$ once enabled by signal MCA on line 152. The frequency $f_o$ of signal FVPA is defined by control signal FRO on line 217. Signal FVPA is the command pulse of FIGS. 1 and 2 applied to the machine tool. However, as shown in FIG. 3B, the command pulse is first applied to smoothing delay circuit 19 (of FIG. 2), then converted into either a forward (CTUPB) or a reverse (CTDNB) signal on respective lines 4OU, 4OD by pulse output logic circuit 140 under control of the sign signal ERPL derived from error sign logic 114 (FIG. 3A) translating the logic statement from comparator 14. The sign signal ERPL is itself determined by the point-to-point operation sign indicated on line 23 (COMPL) from data storage circuit 12.

3. Absolute and Relative Positioning

As explained earlier in relation to FIG. 2, the command pulses on line 21 from pulse generator 11 are also applied to position counter 13, via line 22. This is represented in FIG. 3A by line 122, count direction logic 222 and lines 55 and 65 to position counter 13.

The respective natures and functions of Registers A and B will now be considered in relation to comparator 14 in order to show the derivation of a stop signal ERZ on line 15 as well as other control signals necessary to proper controlling of the grinding wheel motions. In order to conduct a point-to-point operation the motion control unit must know the present position of the tool. This is the function of position counter 13. The position must further be known as measured from the active face of the tool, eg., after dressing if a dressing operation has been done. From such initial position so many command pulses are to be counted in accordance with the desired displacement. While the operator manually sets on the thumbwheels data representing absolute positioning, each effective displacement must be by reference to the actual initial position of the face of the tool. Thus, Register A provides absolute data from the operator and Register B provides relative position data from actual pulse commands transmitted.

A first element of complexity resides in the fact that point-to-point operation must be effected for either of two directions of travel. The direction of travel, of course, depends for each operation on the importance of the desired displacement and of the initial position of the tool following a preceding point-to-point operation.

A second element of complexity resides in that the operator sets absolute positions desired, by reference to an origin in space and with either the forward or the reverse direction of travel from such origin, not from the initial position of the tool. Therefore, a sign is assigned with absolute positioning by the operator, and such data sign from the external panel appears on line 23 as COMPL, a sign signal applied to one control input of error sign logic 114. Similarly there is a sign for each accounted initial position of the tool relative to the same origin in space. This sign is given by signal POSPLB appearing on line 24 and the generation of signal POSPLB is made within "circuit" 13 by comparing the sign of BRPL (on line 25) with count direction when the count in Register B goes to zero. At that moment the system knows which way the count of Register B is in relation to the origin in space e.g. on which side is the tool situated. Signal POSPL is also applied to error sign logic 114. The choice of the effective direction of travel will depend upon the sense of the inequality between $|A|$ and $|B|$ as stored in sensitive Registers A and B, and also upon the relative signs of COMPL and POSPLB. Thus, error sign logic 114 received on lines 26, 27, 28, the logic results of the comparator proper 214 and makes the evaluation between all possible combinations between inequality and signs. The circuitry is shown with more detail in FIG. 9B. In other words, error sign logic 114 establishes when there is equality between the respective magnitudes of the counts in Registers A and B and a correlative equality between signs. In such a case, a zero error signal ERZ is generated which appears on line 15 for the purpose of stopping the generation of command pulses, since the tool must have reached the end point in the point-to-point operation. Thus, when counting absolute displacements, register B may have already a count in one or the other direction. For instance, if at a given moment comparator 14 reads A>B with B = positive (POSPLB) and A = positive (COMPL), the error A−B is positive: ERPL = positive; however, if A = negative and B = positive, then A−B = the value of $|A|$ + the value of $|B|$. Therefore, comparator 14 will establish $|A|>|B|$ and logic 114 will take into consideration the signs. PEPM, the absolute position signal, is supplied from register A to BCD magnitude comparator 214 on line 8 OLPC, the magnitude of the count in Register B appears on line 9 as an input to comparator 214. Inputs A and B are logically compared to derive $|A|<|B|$, on line 26, $|A| = |B|$ on line 27 and $|A|>|B|$ on line 28. When $|A| = |B|$, signal ERZ (error zero) is derived on line 15 at the output of error sign logic 114 to stop the generation of command pulse from generator 11 and also to stop the count of B. The error sign logic 114 is gated by signal ZPRB (zero pulse rate from smoothing) delay circuit, e.g., when no command pulses appear on line 40) derived from line 49 out of pulse rate multiplier 35. As already stated the sign of desired displacement is given by COMPL on line 23 and the sign of the counted pulses in register B appears as POSPLB on line 24, and these determine the sign of ERPL (position error sign out of comparator) on line 25 at the output of error sign logic 114 according to the logic circuitry shown in FIG. 9B. Accordingly, on line 25 (FIG. 3B) the sign of the command pulses from generator 11 (CTUPB or CTDNB) is determined.

Also, on line 28 ($|A|>|B|$) is derived signal MNDP (minimum dress position) which is supplied on line 29 to the program controller 1, via instruction decoder 200, so that a dressing operation can be commanded when necessary.

4. Dress Compensation

Typically, in a grinding machine the tool is a grinding wheel mounted on a wheel slide actuated to feed the grinding wheel toward and from the work surface. As a result of wear, the wheel tends to become dull or irregular or eccentric. It has been the practice to retract the wheel carriage when this happens and to recondition the surface with a diamond tool in an operation called dressing. A renewed surface results from taken away enough matter to expose a clean layer of abrasive. Therefore, any accurate positioning of the tool must take this difference into account. Dressing may be performed automatically at the end of a cycle for the same wheel. It may also be performed as a preparatory measure with a new grinding wheel. These two situations are known to the programmable controller, and special commands appear at the output of instruction decoder 200, as ACDC (Auto Cycle Dress Compensation Initiate), or NWDC (New Wheel Dress Compensation Initiate), at respective lines 46, 47, thereof. These signals are fed to the dress compensation circuit 16 (FIGS. 2 and 3B). Numerical data relative to the amount of dressing required are fed by the operator on the external panel which appear in binary coded form on the same line 301 while being scanned by scanner 304 via line 206 in synchronization with circuit 16 by lines 205 and 316. Two inputs 316 for reading and 216 for storing are derived from the respective lines 205 and 301 and applied to the dress compensation circuit. From such data on line 216 results a count in circuit 16 which is used to generate a series of pulses WDCPB (Wheel Dress Compensation Pulses to Register B) fed to position counter 13, via line 116, and to count direction logic 222 when it is gated by signal WDS2 (Wheel Dress Cycle In Progress) on line 48 from Dress Compensation circuit 16. As a result, so many pulses will be counted in register B thereby to define accurately the distance of travel from the new working surface of the grinding wheel.

5. Point-to-Point Acceleration and Deceleration

The motion control unit 10 of FIGS. 2 and 3A, 3B also includes a smoothing delay circuit 19 inserted on line 21 between the pulse generator 11 and the stepping motor 51. Circuit 19 introduces a delay between inputs and outputs in the transmission of the command pulses received from the generator. Circuit 19 also includes an up/down counter 34 which is responsive for up counts to pulses FVPA received at the input on line 21, and for down counts to those CTB coming out on line 40 toward the stepping motor 51. Circuit 19 further includes a pulse rate multiplier 35 which modifies the rate of the pulses on line 36 in accordance with the count of the up/down counter. As a result of the delay between input and output of circuit 19, when the first pulses are received on line 21 the pulse rate multiplier increases the pulse rate degressively in accordance with the incoming count less the outgoing count until as many come out as come in. When this is obtained, the pulse rate on line 40 is equal to the pulse rate on line 21, which is the selected velocity of travel of the tool. The pulse rate change is so chosen that a proper acceleration of the tool is achieved up to the required speed. When the stop signal is received on line 15, pulse commands are no longer entering the smoothing delay circuit 19. The up/down counter within circuit 19 is now counting down, since pulses are going out on line 42 whereas none is coming on the up count from line 21. This results in a progressive reduction of the pulse rate by the pulse rate multiplier down to zero. The tool is progressively decelerated to a stop in response to the stop signal on line 15.

In order to improve the accuracy without using a more sophisticated circuitry and retain a low cost configuration, the pulse rate of the FVPA signal on line 21 (e.g. $f_o$, at the output of the feed rate override circuit 411) has been chosen in the embodiment to be ten times the desired pulse rate. As a result the signals coming out of pulse rate multiplier 35 have a rate ten times too much. An averaging circuit 38 is provided to bring down the pulse rate to the proper level. However, the error existing between the time intervals on line 42 will average out and a signal of improved frequency quality results on line 49 (CTB). This is the signal which is changed into a forward or a reverse command pulse by pulse output logic 140 (FIG. 3B).

6. Feedback Compensation

The circuit of FIG. 3B shows the feedback loop of FIG. 2 with more details.

An encoder logic circuit 72 receives on lines 70 and 71 a gate reference signal FBR and count quadrature signal FBF, respectively, from feedback generator PG via respective lines 66, 67 and line receivers 68, 69. At the output of the encoder logic circuit 72 on respective lines 45U and 45D appear forward and reverse signals (FBUPA: encoder feedback pulses forward, and FBDNA: encoder feedback pulses reverse). These signals are compared with the output signals on lines 41U and 41D from the pulse output logic 140, by a position error counter 131. Thus at the UP input of position error counter (3) at a given time the forward command pulse CTUPB is compared with the forward feedback actual pulse FBUPA applied at the DN input via line 45D. In the same fashion, the reverse command pulse CTDNB would be applied on line 41D to the DN input of the position error counter 131 to be compared with the reverse feedback actual pulse on line 45U at the UP input thereof.

At the output of position error counter 131 are derived an error signal (on line 146) and a sign signal FBERPL (on line 74). The correction pulse logic 132 is responsive to the signal CLZE on lines 147 from zero detect circuit 133, and to signal FBERPL. At the output appear compensation pulses, on lines 44U, or 44D, (depending on the sign of the error). As a result, any discrepancy between the pilot generator output and the command pulses received from the smoothing delay circuit 19 is compensated by pulses applied on line 44U, or line 44D, to respective summers 43U and 43D, which are in the form of $10\mu S$ pulse shaping circuits.

D. Circuitry

Figure 5:
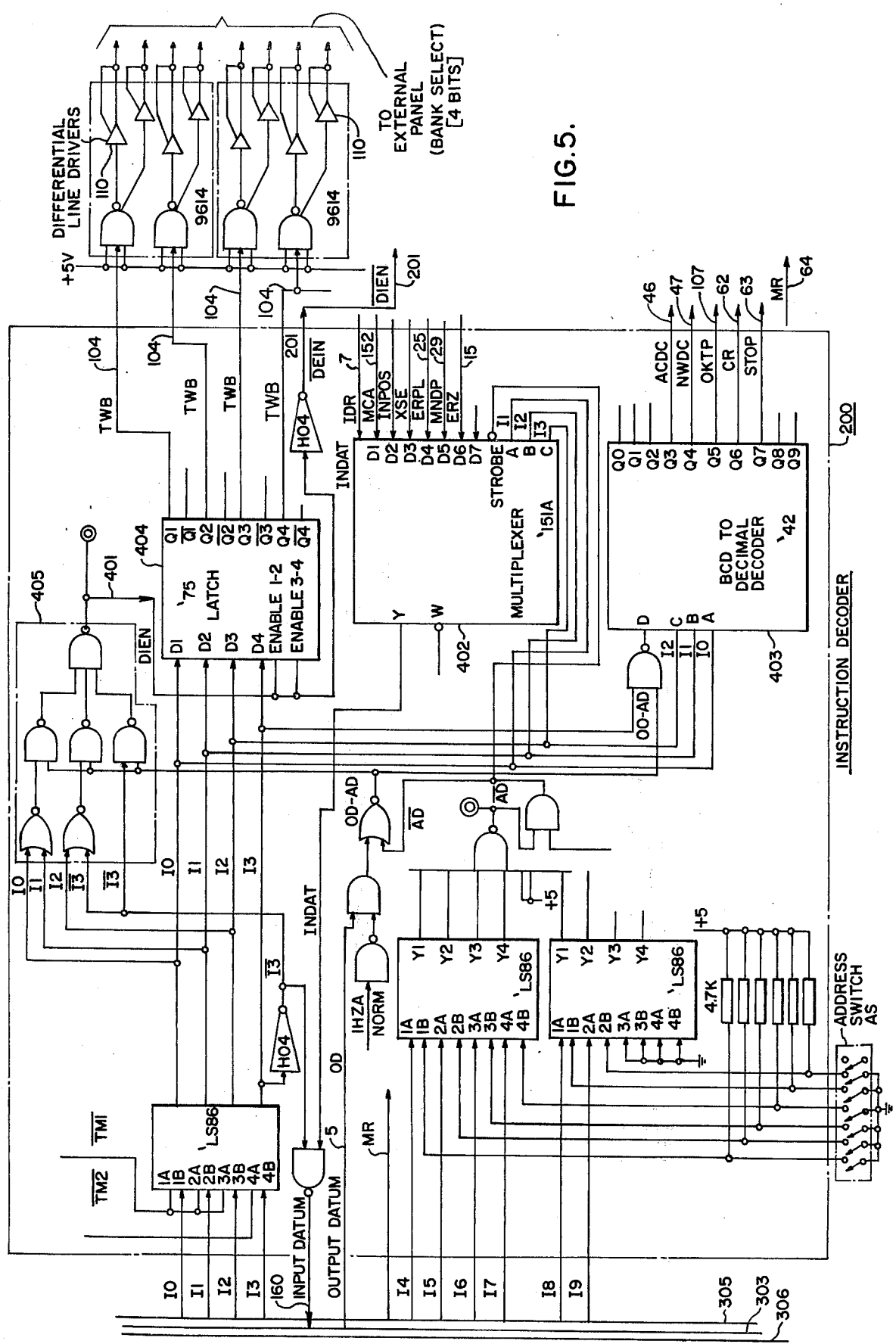
FIG. 5 shows the instruction decoder of FIG. 3A.

FIG. 5 represents actual circuits for the instruction encoder 200 used in the preferred embodiment implementing the motion control unit according to the present invention. Monolithic devices are identified by a coded reference as generally known by the man skilled in the art. An apostrophe is used to abbreviate 74, when designating a monolithic device. Detailed specifications may be consulted, for instance by reference to "The TTL Data Book, 1st Edition, 1973 - Texas Instrument Inc."

Thus, in FIG. 5, the following devices are mounted in circuit:

| | |
|---|---|
| 74 LS 86 for | Quad 2 - input exclusive - OR gate |
| 7475 | 4-bit Bistable Latch |
| 7442 | BCD to Decimal Decoder |
| 74151A | Data Selector/Multiplier |

FIG. 5 illustrates the use of instructions $I_4 - I_9$ in combination with an address switch AS mounted on the entry card of the printed circuits. Having properly set the address switch to select a proper instruction $I_4 - I_9$, when such instruction appears on the instruction bus 305, an enabling signal $\overline{AD}$ will be generated which combines logically with the output datum signal OD on line 5 from the control bus, to permit operation of the motion control unit, as previously described and explained herein.

Figure 6:
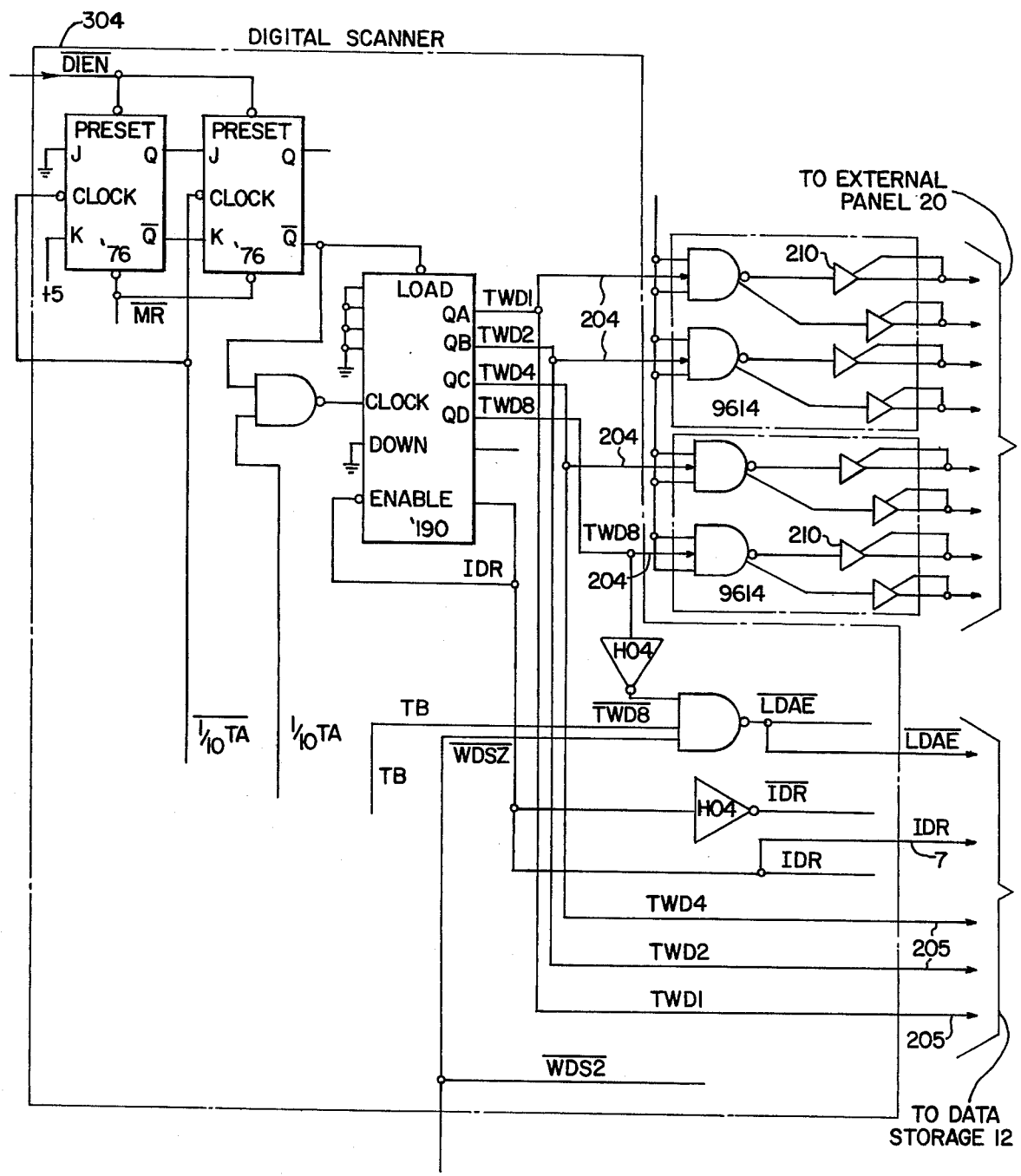
FIG. 6 shows the digital scanner of FIG. 3A.

FIG. 6 represents the scanner initiated by signal DIEN on line 201 which generates a combination of binary select signals $TWD_1$, $TWD_2$, $TWD_4$ and $TWD_8$.

In this instance two flip-flops 7476 are used. Device 74190 is a synchronous up/down counter with down/up mode control to generate signals TWD on line 204, and signal IDR on line 7 when the scanning operation has been completed.

Figure 7A:
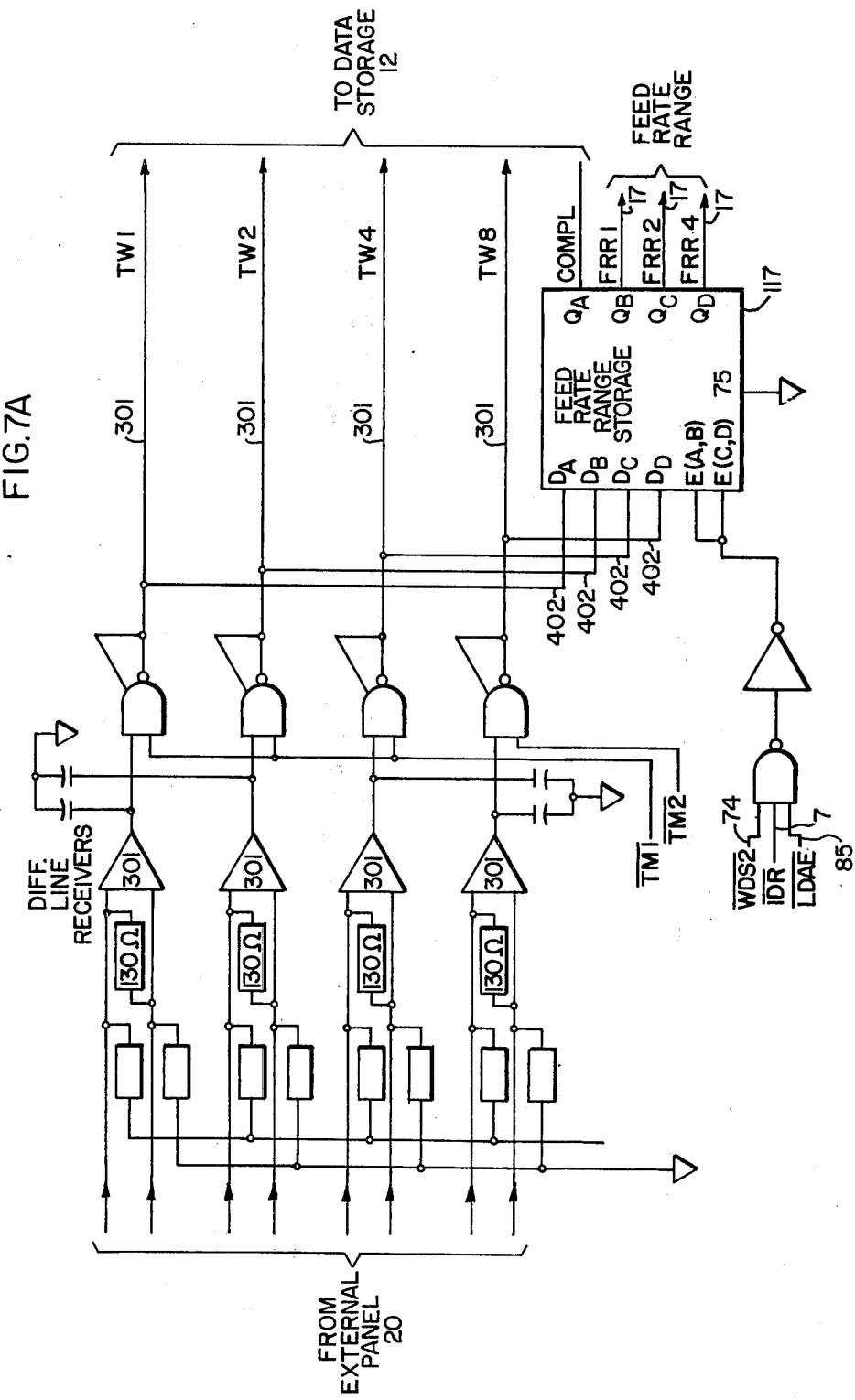
FIGS. 7A and 7B show the input data storage of FIGS. 1, 2 and 3A.

FIG. 7A shows the reception of signals $TW_1$, $TW_2$, $TW_4$ and $TW_8$ by data storage 117 on line 301 from differential line receivers. The storing operation is synchronized by the digital scanner of FIG. 6, via lines 75 (signal LDAE) and 7 (signal IDR). Storing of FRR data into Feed Rate Range Storage 117 is only possible, as shown at the bottom of FIG. A, if signal $WDS_2$ (line 74) indicates no-dress compensation, signal IDR (line 7 from FIG. 6) indicates position and velocity storing in data storage 12 is completed, and signal LDAE (line 85 and FIG. 6) shown by its status that only 3 bits are being derived (last decade from external panel).

The monolithic device used as data storage 117 is a 7475, 4-bit bistable latch.

Figure 7B:
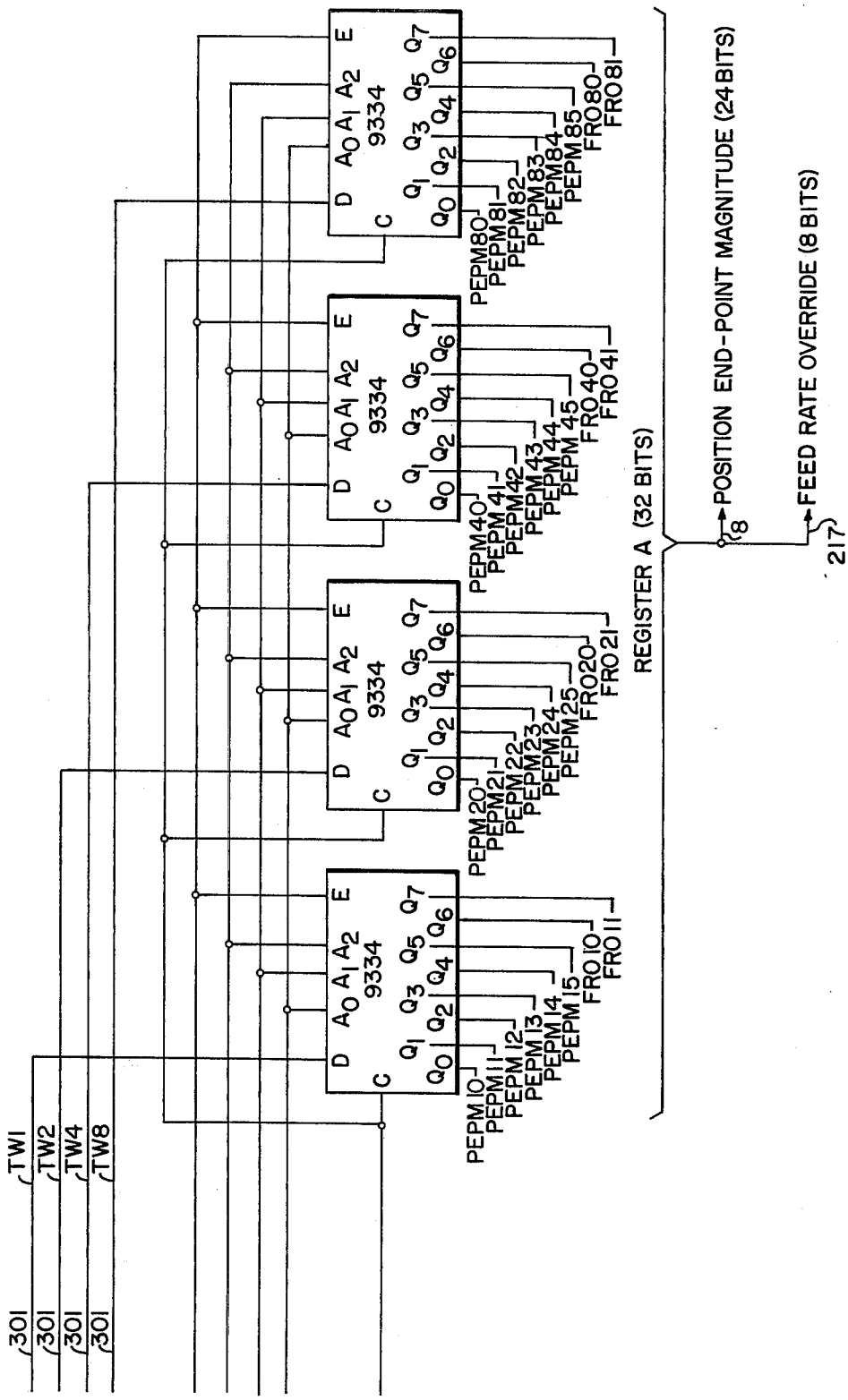

FIG. 7B shows the circuitry associated with Register A. Four Fairchild TTL monolithic devices 9334, 8-bit addressable latches (8 flip-flops) are used to convert data on line 301 ($TW_1$, $TW_2$, $TW_4$, $TW_8$) into decimal representation: PEPM and FRO (on lines 8 and 217, respectively), for position and velocity.

Figure 8:
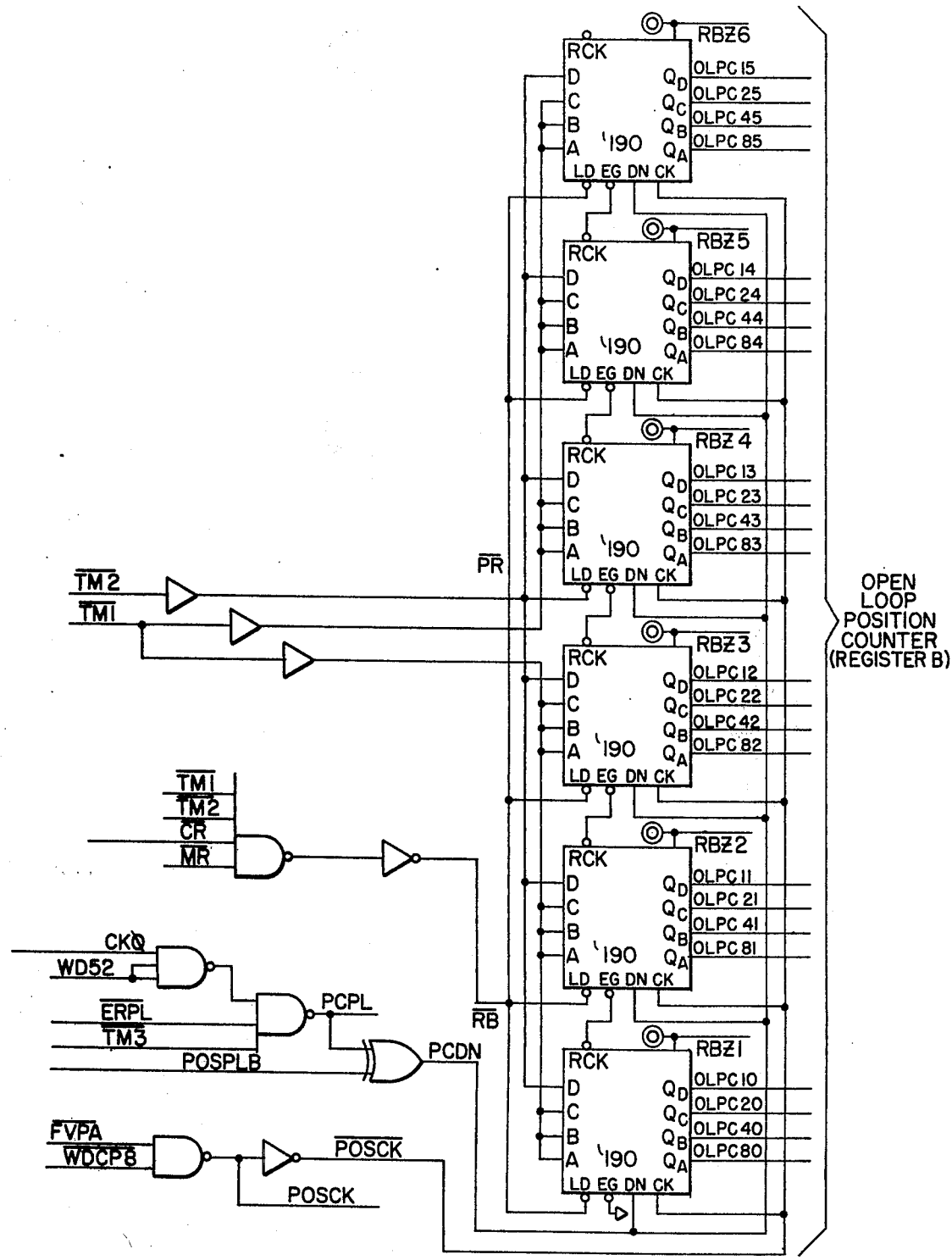
FIG. 8 illustrates the internal organization of the position counter of FIGS. 1, 2 and 3A.

FIG. 8 shows the circuitry associated with Register B. Six monolithic devices of the type 74190 (synchronous up/down counter with down/up mode control) are used to convert the pulse count FVPA on line 22 into a decimal position count (OLPC) on line 9 to the comparator.

Figure 9A:
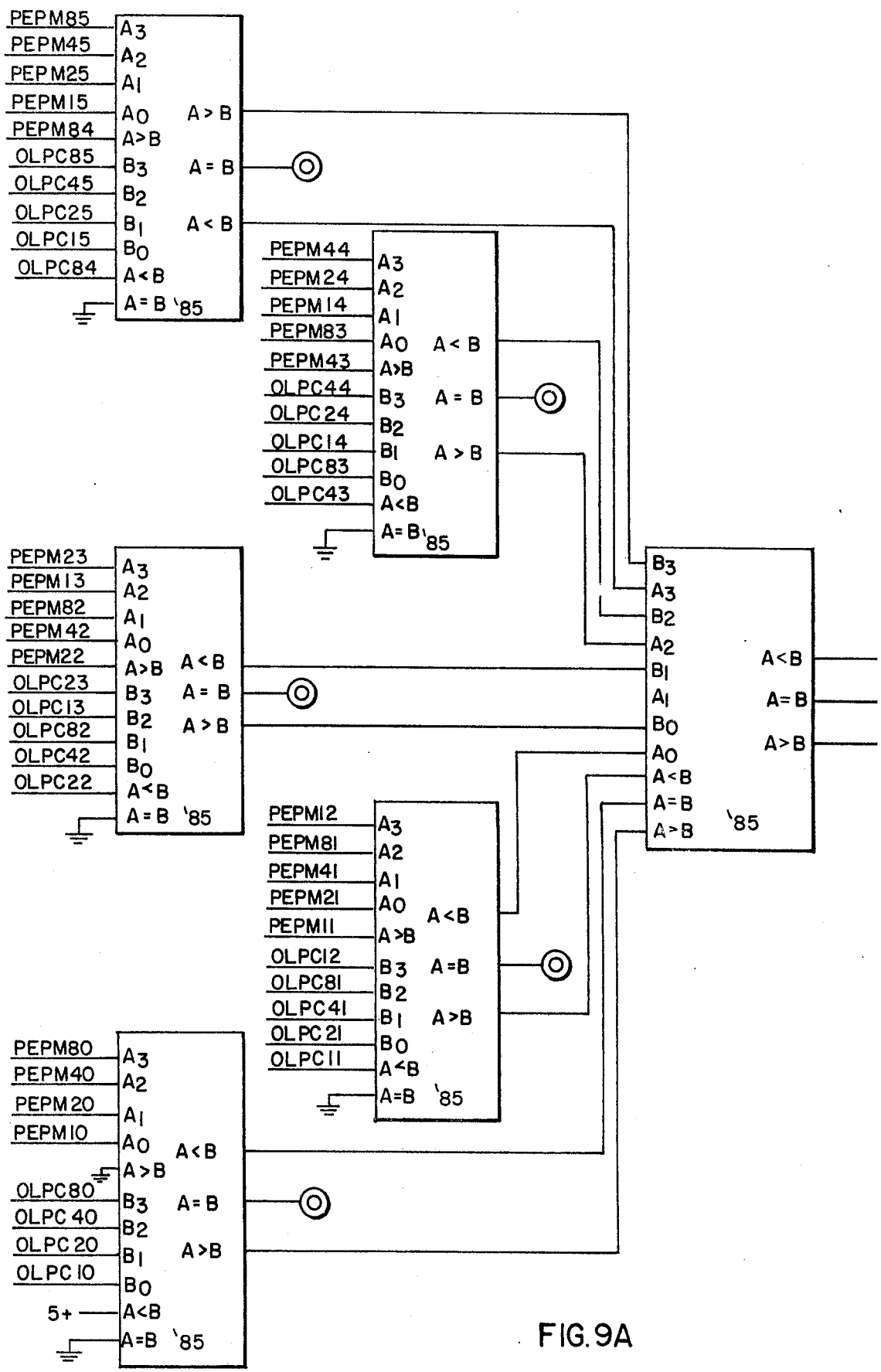
FIGS. 9A and 9B show the circuitry of the comparator.
Figure 9B:
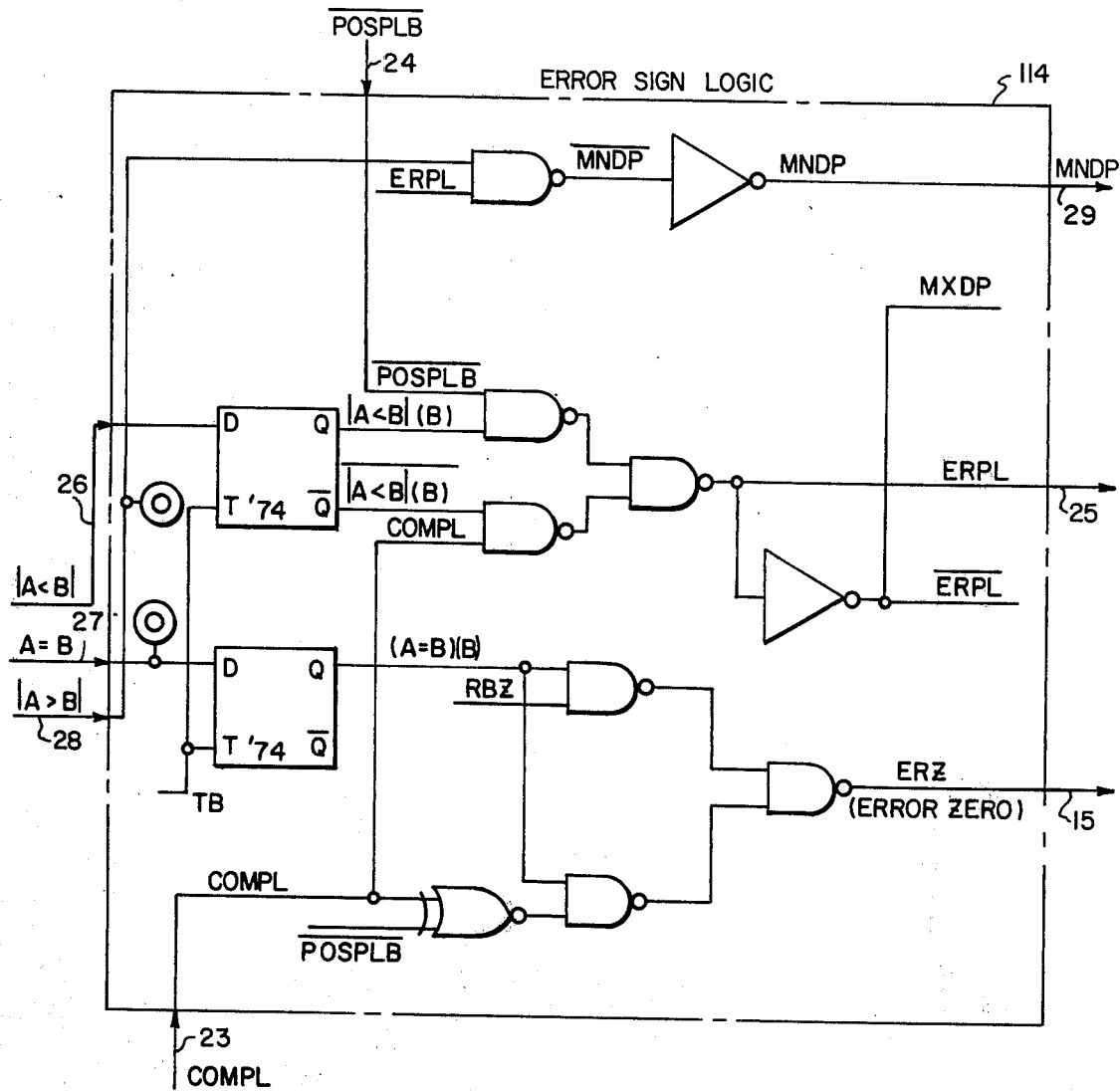

FIGS. 9A and 9B together show the circuitry of comparator 14.

The circuit of FIG. 9A is already known and described in the aforementioned TTL Data Book, 1st Edition, 1973 on page 208. It includes six monolithic devices of the type 7485 (4-bit magnitude comparator) which are responsive to the outputs of Registers A and B to generate the logic A>B, A = B and A<B.

FIG. 9B uses flip-flops of the 7474 type, for the generation of signals ERZ (position error zero) and ERPL (position error sign), for supplementing the detection and control technique hereabove explained.

Figure 10:
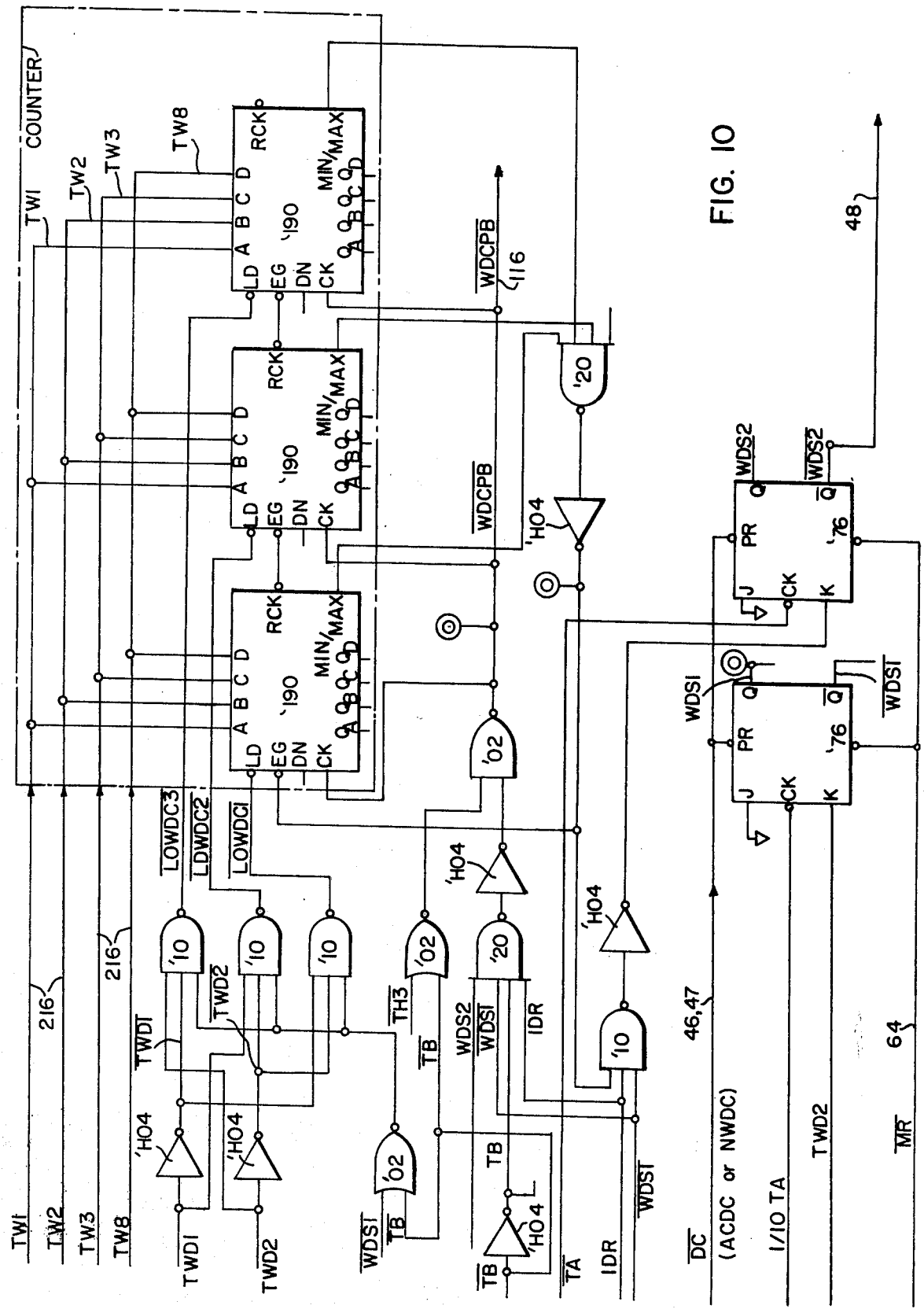
FIG. 10 shows the circuitry of the dress compensation circuit of FIG. 3A.

FIG. 10 shows the circuitry of the dress compensation circuit 16. Three monolithic devices are used of the type 74190 (synchronous up/down counter with down/up mode control) for generating on line 116 dress compensation pulses WDCPB. Also, two monolithic flip-flops of the type 7476 are used for the derivation of signal WDS2 on line 48 in response to either signal ACDC or signal NWDC on respective lines 46, 47. The circuitry of FIG. 10 is such that either signal ACDC or signal NWDC may appear as the signal $\overline{DC}$ supplied to the dual bistable circuit for the generation of signal $\overline{WDS2}$ on line 40.

Figure 11:
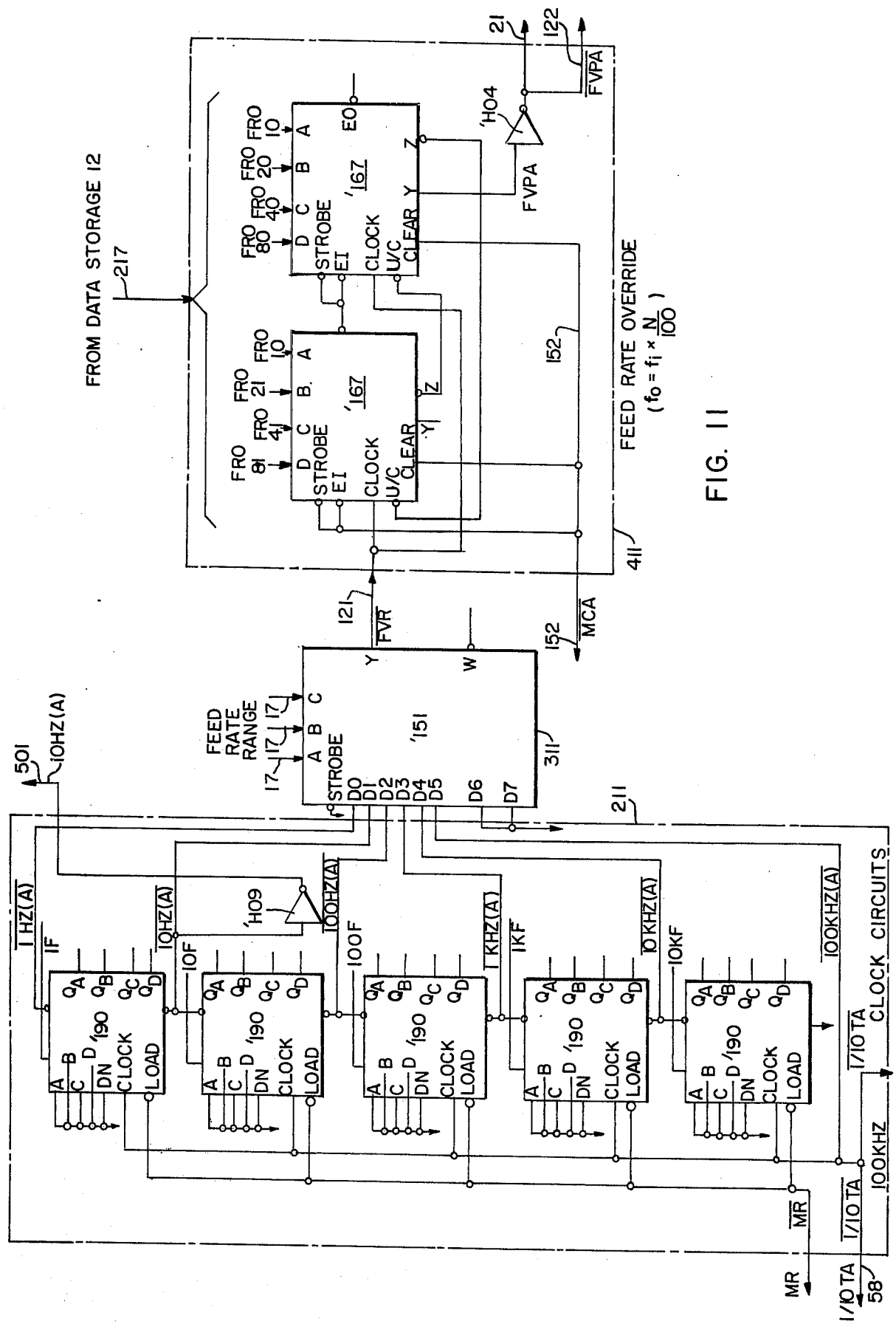
FIG. 11 shows the pulse generator according to the present invention.

FIG. 11 shows the pulse generator 11. The clock circuits 211 include five 74190 devices (synchronous up/down counter with down/up mode control). The Feed Rate Range select Mixer 311 comprises a data selector/multiplexer of the type 74151, the selection being made from line 17. Feed rate override is achieved with two 74167 devices (synchronous decade rate multiplier).

Figure 12A:
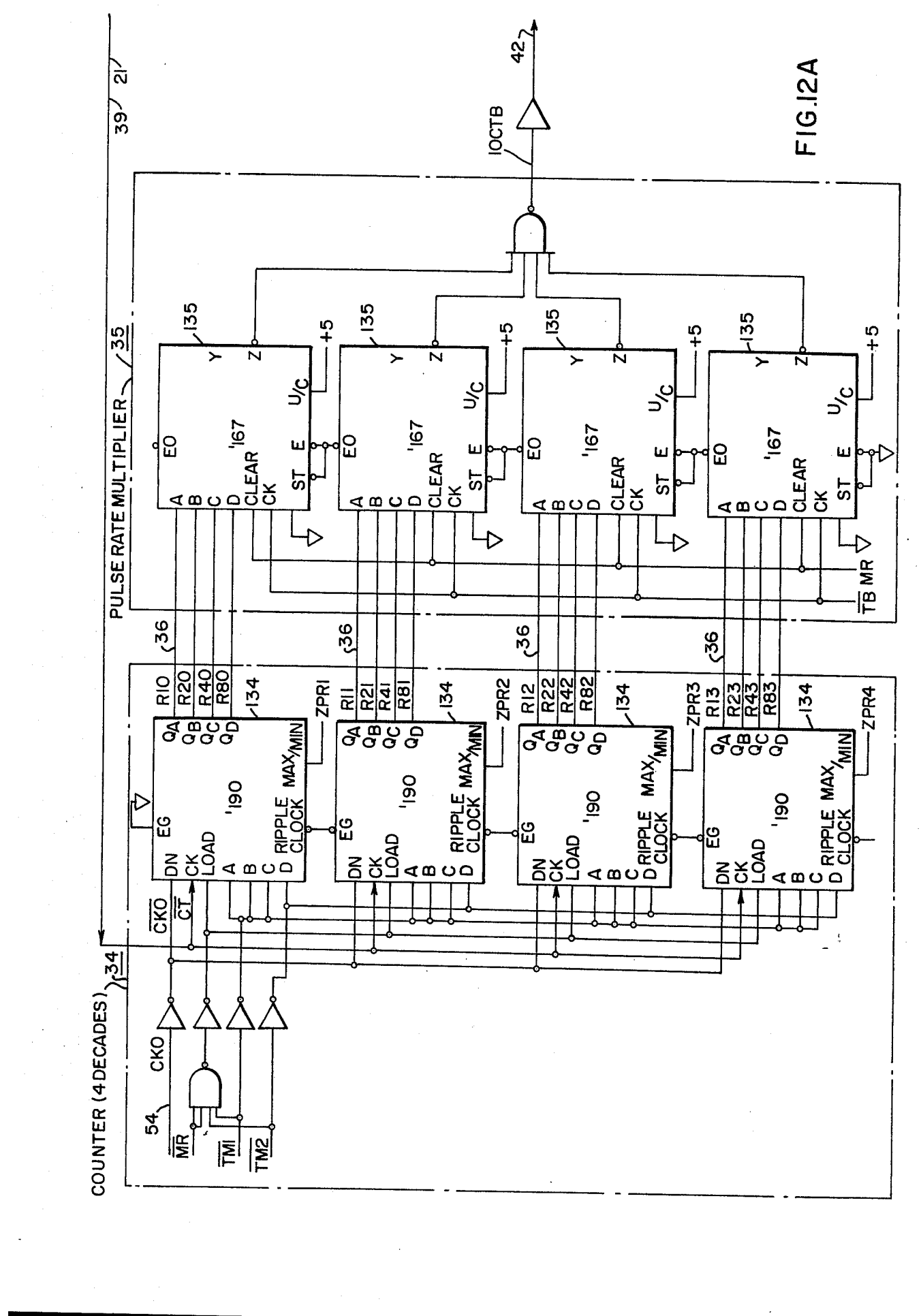
Figure 12B:
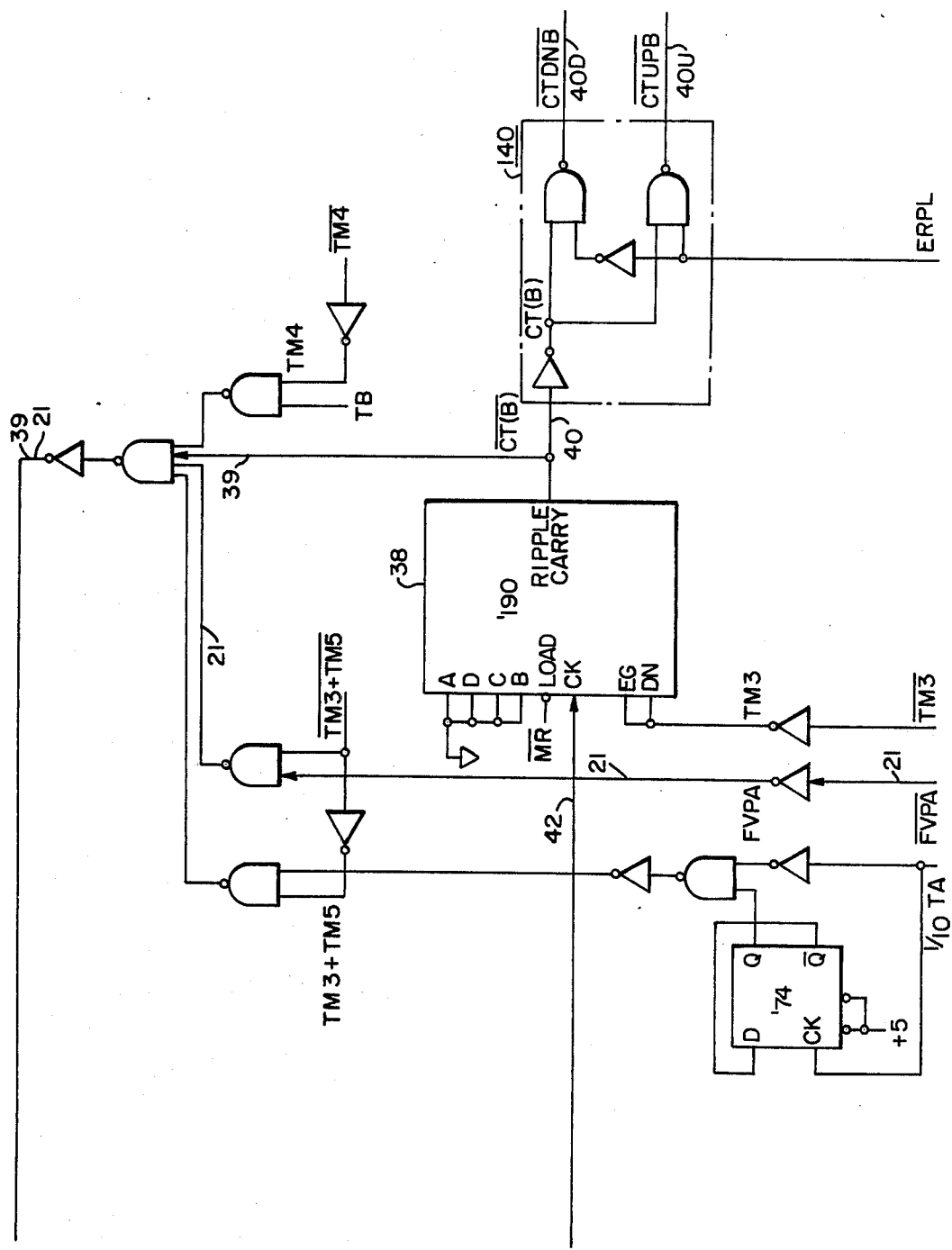

FIG. 12A shows the circuitry of the smoothing delay circuit 19. The 4 decade counter 34 includes 74190 devices (see the aforementioned description) and the pulse rate multiplier 35 includes four (synchronous devices 8synchronous decade rate multipliers). One device of the type 74190 is also used at 38 in FIG. 12B for generating a signal at (1/10) the rate of the inputted signals on line 42 from FIG. 12A. With regard to the circuitry of FIGS. 12A, 12B it is worth mentioning that, as shown on FIG. 14, signal CKO is applied on the same input DN of devices 74190 of counter 34 and determines alternately the up and down counts. Therefore, instead of two inputs up and down, as in FIG. 3B, only one line carries the input and output pulses (21 and 39, respectively). Non-coincident clock pulses TA, TB provide the output pulse times (TB for down, TA for up). The FVPA pulses (FIG. 12B) are gated by one of the TA pulses (the $f_o$ signal gates on a TA clock pulse and the $f_o$ signals are spread thereafter to provide the output frequency). Similarly (FIG. 12B) the output pulses on line 42 are synchronized with CTB and with TB. This two-phase system eliminates circuitry for anti-coincidence pulses.

Figure 13:
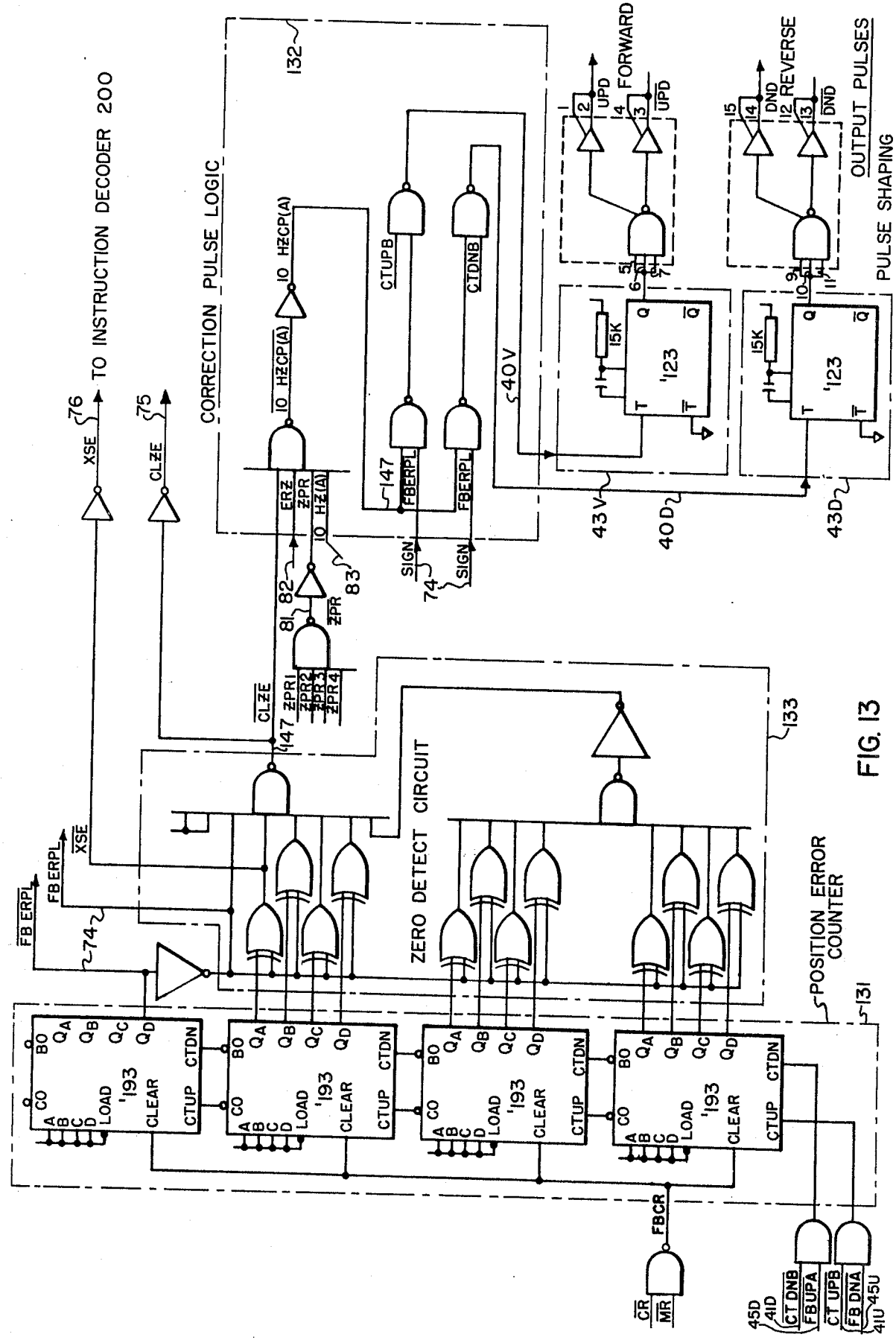
FIG. 13 illustrates a feedback loop used in the preferred embodiment of the present invention.

FIG. 13 illustrates the circuitry of the feedback loop from the pilot generator generating compensating pulses to the command pulse line. Here a synchronous 4-bit up/down monolithic counter is used of the type having dual clock with clear (74193). Also by 74123 is identified a dual retriggerable monostable multivibrator with clear.

Figure 14:
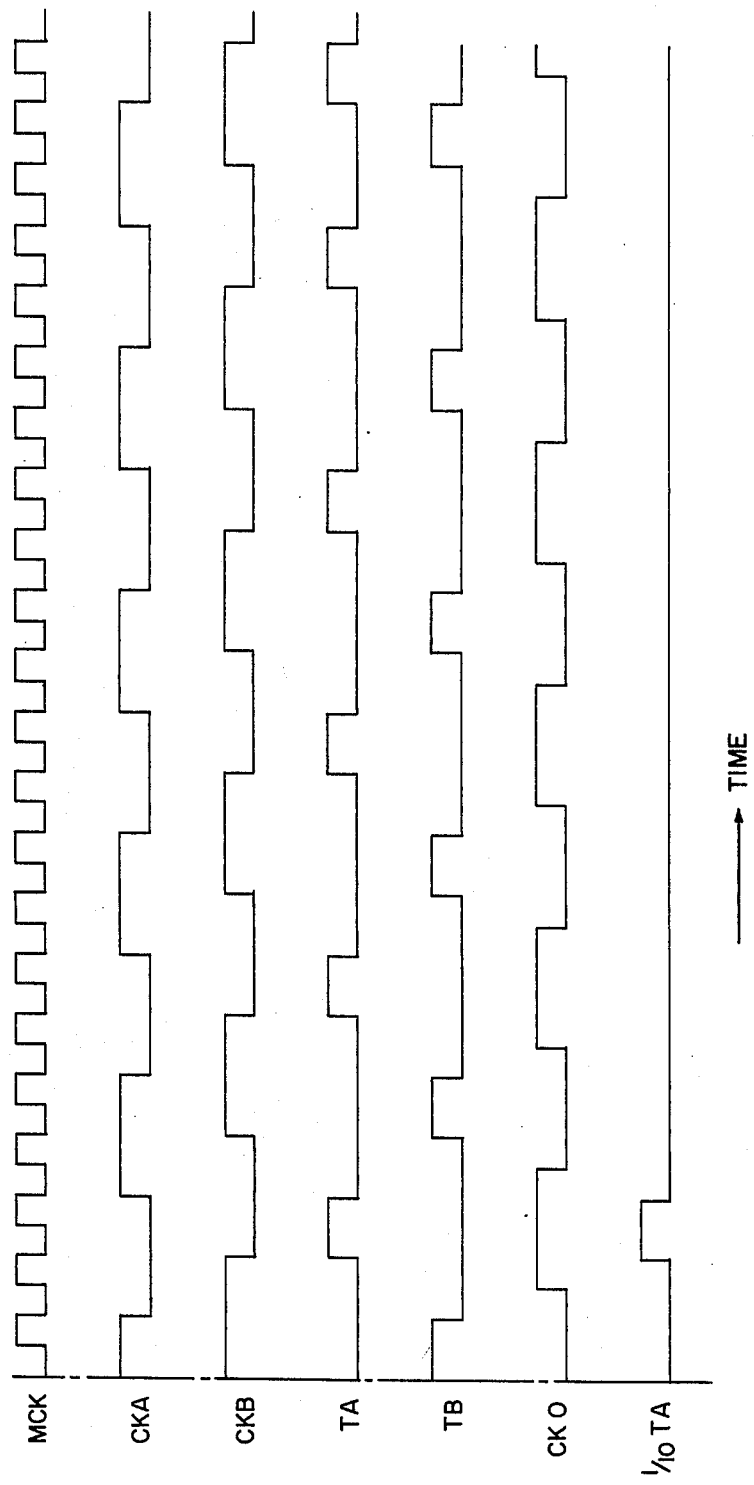
FIG. 14 shows time pulses used in the circuitry of FIGS. 5 to 13.

FIG. 14 shows the timing of pulses MCK, CKA, CKB, TA, TB, CKO and (1/10) TA used at various inputs in the circuitry of the motion control unit.

A summary of the signal names and definitions is provided as follows:

| Signal Name | Definition |
| --- | --- |
| ACDC | Auto cycle dress compensation initiate |
| CKϕ | Clock phase signal |
| CLZE | Closed loop zero err. |
| COMPL | Position end point sign (command=plus) |
| CR | Counters reset - position and pos. error |
| CTB | Pulse output from pulse rate smoothing circuit |
| CTDNB | Output pulses reverse |
| CTUPB | Output pulses fwd. |
| DIEN | Data input enable (initiates input scan) |
| ERPL | Position error sign out of comparator |
| ERZ | Position error=zero out of comparator |
| FBERPL | Position error sign from closed loop cntr. |
| FBR | Encoder gate (reference) |
| FBQ | Encoder count (quadrature) |
| FBDNA | Encoder FDBK pulses rev. |
| FBUPA | Encoder FDBK pulses fwd. |
| FRO | Feed rate override data input from panel |
| FRR | Feed rate range data input from panel |
| FVR | Pulses out of range sel. |
| FVPA | Pulses out of rate override (pulses into position counter and smoothing circuit) |
| I0...I9 | Instruction bus signals |
| IDR | Input data ready (input scan completed) |
| INPOS | "In position" signal |
| MCA | Pulse enable signal |
| MCK | Master oscillator output |
| MNDP | Minimum dress pos ($|A|>|B|$) |
| MR | Master reset |
| NWDC | New wheel dress compensation initiate |
| OLPC | Position counter (Reg.B) output (position magnitude) |
| PEPM | Position end point magn. (data in Reg. A from panel) |
| POSPLB | Sign from position counter circuit |
| R | Rate data in pulse rate smoothing circuit |
| PEPM | Position end point magni. (data in Reg. A from panel) |
| POSPLB | Sign from position counter circuit |
| R | Rate data in pulse rate smoothing circuit |
| STOP | Pulse output stop command |
| TA | 2 ϕ clock, non overlapping phases |
| TB | |
| 1/10 TA | 100 KHZ (1/10 of TA freq.) |
| TW | Data from thumbwheels (one decade) |

| Signal Name | Definition |
| --- | --- |
| TWB | Thumbwheel bank select address |
| TWD | Thumbwheel digit select address |
| WDCPB | Wheel dress comp. pulses to Reg. B |
| WDS2 | Wheel dress cycle in progress |
| XSE | Excess error in position error counter |
| ZPRB | Zero pulse rate from smoothing circuit |

We claim:

1. A machine tool control system comprising: programmable sequence control means for providing programmed sequential operation instructions for motion control;
at least one motion control means responsive to said sequential operation instructions for generating motion control signals to an associated machine tool;
means associated with said one motion control means for providing predetermined numerical control instructions;
translator means associated with said one motion control means for converting said sequential operation instructions into compatible translated signals, said motion control signals being generated in accordance with said translated signals and in relation to said numerical control instructions.

2. The control system of claim 1 with said motion control means generating motion status signals characteristic of the motions of said machine tool, and with said translator means being responsive to said motion status signals for providing an interface with said programmable sequence control means.

3. The control system of claim 1 with the provision of means responsive to said translator means for selecting said numerical control instructions.

4. The control system of claim 3 with said numerical control instructions including position and speed representing instructions, said one motion control means including means for generating a plurality of predetermined speed control signals and means responsive to a selected one of said speed representing instructions for selecting a corresponding one of said predetermined speed control signals to assign a corresponding speed to said tool.

5. The control system of claim 3 with said one motion control means including: means responsive to said numerical control instructions for storing a coded number representative of desired tool positioning and means responsive to tool motion for accumulating counts representative of instantaneous actual tool positioning, and means for instantaneously comparing said actual count with said coded number to generate control signals for effecting an absolute tool displacement in accordance with said coded number, and for generating status signals representing tool positioning relative to said coded number; said comparing means being operative sequentially in response to said programmable sequence control means to cause tool motion between successive predetermined positions as programmed in said programmable sequence control means.

6. The control system of claim 5 with said programmable sequence control means including means for outputting process command signals and means for inputting process status signals, said process command signals being operative on said machine tool, and said process status signals being operative with said machine tool.

7. The control system of claim 5 with said associated machine tool being a grinding wheel; with said numerical control instructions including instructions representing distance compensation for a dress operation on said grinding wheel; with said means responsive to said numerical control instructions storing an additional code number representative of said distance compensation; said actual count being modified by said additional code number and said means for instantaneously comparing being operative to compare said modified actual count with said first mentioned coded number; whereby said means for instantaneously comparing causes concurrent positioning and dress compensation with said grinding wheel.

* * * * *